(12) United States Patent
Okarski et al.

(10) Patent No.: US 12,440,263 B2
(45) Date of Patent: Oct. 14, 2025

(54) SYSTEMS AND METHODS FOR TRIPODIC SPINES FORMING A SPHERICAL BASKET FOR IMPROVED TISSUE CONTACT AND CURRENT DELIVERY

(71) Applicant: Biosense Webster (Israel) Ltd., Yokneam (IL)

(72) Inventors: Kevin Mark Okarski, Monrovia, CA (US); Keshava Datta, Chino Hills, CA (US); Abubakarr Bah, Irvine, CA (US); Thanh Nguyen, El Monte, CA (US)

(73) Assignee: Biosense Webster (Israel) Ltd., Yokneam (IL)

( * ) Notice: Subject to any disclaimer, the term of this patent is extended or adjusted under 35 U.S.C. 154(b) by 447 days.

(21) Appl. No.: 18/065,939

(22) Filed: Dec. 14, 2022

(65) Prior Publication Data
US 2023/0225784 A1    Jul. 20, 2023

Related U.S. Application Data

(60) Provisional application No. 63/301,180, filed on Jan. 20, 2022.

(51) Int. Cl.
*A61B 18/14* (2006.01)
*A61B 5/00* (2006.01)
(Continued)

(52) U.S. Cl.
CPC .............. *A61B 18/14* (2013.01); *A61B 5/287* (2021.01); *A61B 5/6858* (2013.01);
(Continued)

(58) Field of Classification Search
CPC . A61B 18/14; A61B 18/1492; A61B 2562/12; A61B 5/287; A61B 5/6858
See application file for complete search history.

(56) References Cited

U.S. PATENT DOCUMENTS

| | | | |
|---|---|---|---|
| 4,699,147 A | 10/1987 | Chilson et al. | |
| 4,940,064 A | 7/1990 | Desai | |

(Continued)

FOREIGN PATENT DOCUMENTS

| | | |
|---|---|---|
| CN | 105761835 A | 7/2016 |
| CN | 111248993 A | 6/2020 |

(Continued)

OTHER PUBLICATIONS

Extended European Search Report and Opinion dated Jun. 7, 2023, from corresponding European Application No. 23152477.8.
(Continued)

*Primary Examiner* — Eun Hwa Kim

(57) ABSTRACT

The disclosed technology includes a medical probe comprising a tubular shaft extending along a longitudinal axis and including a proximal end and a distal end. The medical probe further comprises an expandable basket assembly proximate the distal end of the tubular shaft. The basket assembly comprises a first unitary tripodic structure and a second unitary tripodic structure, each tripodic structure formed from a respective planar sheet of material that includes three linear spines converging at a respective central spine intersection and one or more electrodes coupled to each of the spines, each electrode defining a lumen through the electrode so that the spine extends through the lumen of each of the one or more electrodes. Each tripodic structure formed from a respective planar sheet of material that includes three linear spines converging at a respective central spine intersection.

20 Claims, 12 Drawing Sheets

(51) Int. Cl.
*A61B 5/287* (2021.01)
*A61B 18/00* (2006.01)

(52) U.S. Cl.
CPC .. *A61B 18/1492* (2013.01); *A61B 2018/0016* (2013.01); *A61B 2018/00267* (2013.01); *A61B 2018/00613* (2013.01); *A61B 2218/002* (2013.01); *A61B 2562/12* (2013.01)

(56) References Cited

U.S. PATENT DOCUMENTS

| | | |
|---|---|---|
| 5,215,103 A | 6/1993 | Desai |
| 5,255,679 A | 10/1993 | Imran |
| 5,293,869 A | 3/1994 | Edwards et al. |
| 5,309,910 A | 5/1994 | Edwards et al. |
| 5,313,943 A | 5/1994 | Houser et al. |
| 5,324,284 A | 6/1994 | Imran |
| 5,345,936 A | 9/1994 | Pomeranz et al. |
| 5,365,926 A | 11/1994 | Desai |
| 5,396,887 A | 3/1995 | Imran |
| 5,400,783 A | 3/1995 | Pomeranz et al. |
| 5,411,025 A | 5/1995 | Webster, Jr. |
| 5,415,166 A | 5/1995 | Imran |
| 5,456,254 A | 10/1995 | Pietroski et al. |
| 5,465,717 A | 11/1995 | Imran et al. |
| 5,476,495 A | 12/1995 | Kordis et al. |
| 5,499,981 A | 3/1996 | Kordis |
| 5,526,810 A | 6/1996 | Wang |
| 5,546,940 A | 8/1996 | Panescu et al. |
| 5,549,108 A | 8/1996 | Edwards et al. |
| 5,558,073 A | 9/1996 | Pomeranz et al. |
| 5,577,509 A | 11/1996 | Panescu et al. |
| 5,595,183 A | 1/1997 | Swanson et al. |
| 5,598,848 A | 2/1997 | Swanson et al. |
| 5,609,157 A | 3/1997 | Panescu et al. |
| 5,628,313 A | 5/1997 | Webster, Jr. |
| 5,681,280 A | 10/1997 | Rusk et al. |
| 5,718,241 A | 2/1998 | Ben-Haim et al. |
| 5,722,401 A | 3/1998 | Pietroski et al. |
| 5,722,403 A | 3/1998 | McGee et al. |
| 5,725,525 A | 3/1998 | Kordis |
| 5,730,128 A | 3/1998 | Pomeranz et al. |
| 5,772,590 A | 6/1998 | Webster, Jr. |
| 5,782,239 A | 7/1998 | Webster, Jr. |
| 5,782,899 A | 7/1998 | Imran |
| 5,823,189 A | 10/1998 | Kordis |
| 5,881,727 A | 3/1999 | Edwards |
| 5,893,847 A | 4/1999 | Kordis |
| 5,904,680 A | 5/1999 | Kordis et al. |
| 5,911,739 A | 6/1999 | Kordis et al. |
| 5,928,228 A | 7/1999 | Kordis et al. |
| 5,944,022 A | 8/1999 | Nardella et al. |
| 5,968,040 A | 10/1999 | Swanson et al. |
| 5,983,126 A | 11/1999 | Wittkampf |
| 6,014,579 A | 1/2000 | Pomeranz et al. |
| 6,014,590 A | 1/2000 | Whayne et al. |
| 6,023,638 A | 2/2000 | Swanson |
| 6,119,030 A * | 9/2000 | Morency ............... A61B 5/283 600/374 |
| 6,198,974 B1 | 3/2001 | Webster, Jr. |
| 6,216,043 B1 | 4/2001 | Swanson et al. |
| 6,216,044 B1 | 4/2001 | Kordis |
| 6,428,537 B1 | 8/2002 | Swanson et al. |
| 6,456,864 B1 | 9/2002 | Swanson et al. |
| 6,484,118 B1 | 11/2002 | Govari |
| 6,574,492 B1 | 6/2003 | Ben-Haim et al. |
| 6,584,345 B2 | 6/2003 | Govari |
| 6,600,948 B2 | 7/2003 | Ben-Haim et al. |
| 6,738,655 B1 | 5/2004 | Sen et al. |
| 6,741,878 B2 | 5/2004 | Fuimaono et al. |
| 6,748,255 B2 | 6/2004 | Fuimaono et al. |
| 6,780,183 B2 | 8/2004 | Jimenez, Jr. et al. |
| 6,837,886 B2 | 1/2005 | Collins et al. |
| 6,866,662 B2 | 3/2005 | Fuimaono et al. |
| 6,892,091 B1 | 5/2005 | Ben-Haim et al. |
| 6,970,730 B2 | 11/2005 | Fuimaono et al. |
| 6,973,340 B2 | 12/2005 | Fuimaono et al. |
| 6,980,858 B2 | 12/2005 | Fuimaono et al. |
| 6,987,995 B2 | 1/2006 | Drysen |
| 7,048,734 B1 | 5/2006 | Fleischman et al. |
| 7,142,903 B2 | 11/2006 | Rodriguez et al. |
| 7,149,563 B2 | 12/2006 | Fuimaono et al. |
| 7,255,695 B2 | 8/2007 | Falwell et al. |
| 7,257,434 B2 | 8/2007 | Fuimaono et al. |
| 7,274,957 B2 | 9/2007 | Drysen |
| 7,377,906 B2 | 5/2008 | Selkee |
| 7,399,299 B2 | 7/2008 | Daniel et al. |
| 7,410,486 B2 | 8/2008 | Fuimaono et al. |
| 7,522,950 B2 | 4/2009 | Fuimaono et al. |
| 7,591,799 B2 | 9/2009 | Selkee |
| 7,593,760 B2 | 9/2009 | Rodriguez et al. |
| RE41,334 E | 5/2010 | Beatty et al. |
| 7,720,517 B2 | 5/2010 | Drysen |
| 7,846,157 B2 | 12/2010 | Kozel |
| 7,853,302 B2 | 12/2010 | Rodriguez et al. |
| 7,930,018 B2 | 4/2011 | Harlev et al. |
| 8,000,765 B2 | 8/2011 | Rodriguez et al. |
| 8,007,495 B2 | 8/2011 | McDaniel et al. |
| 8,021,327 B2 | 9/2011 | Selkee |
| 8,048,063 B2 | 11/2011 | Aeby et al. |
| 8,103,327 B2 | 1/2012 | Harlev et al. |
| 8,167,845 B2 | 5/2012 | Wang et al. |
| 8,224,416 B2 | 7/2012 | De La Rama et al. |
| 8,235,988 B2 | 8/2012 | Davis et al. |
| 8,275,440 B2 | 9/2012 | Rodriguez et al. |
| 8,295,902 B2 | 10/2012 | Salahieh et al. |
| 8,346,339 B2 | 1/2013 | Kordis et al. |
| 8,357,152 B2 | 1/2013 | Govari et al. |
| 8,435,232 B2 | 5/2013 | Aeby et al. |
| 8,447,377 B2 | 5/2013 | Harlev et al. |
| 8,475,450 B2 | 7/2013 | Govari et al. |
| 8,498,686 B2 | 7/2013 | Grunewald |
| 8,517,999 B2 | 8/2013 | Pappone et al. |
| 8,545,490 B2 | 10/2013 | Mihajlovic et al. |
| 8,560,086 B2 | 10/2013 | Just et al. |
| 8,567,265 B2 | 10/2013 | Aeby et al. |
| 8,712,550 B2 | 4/2014 | Grunewald |
| 8,728,065 B2 | 5/2014 | Fish et al. |
| 8,755,861 B2 | 6/2014 | Harlev et al. |
| 8,825,130 B2 | 9/2014 | Just et al. |
| 8,906,011 B2 | 12/2014 | Gelbart et al. |
| 8,945,120 B2 | 2/2015 | McDaniel et al. |
| 8,979,839 B2 | 3/2015 | De La Rama et al. |
| 9,037,264 B2 | 5/2015 | Just et al. |
| 9,131,980 B2 | 9/2015 | Bloom |
| 9,204,929 B2 | 12/2015 | Solis |
| 9,277,960 B2 | 3/2016 | Weinkam et al. |
| 9,314,208 B1 | 4/2016 | Altmann et al. |
| 9,339,331 B2 | 5/2016 | Tegg et al. |
| 9,486,282 B2 | 11/2016 | Solis |
| 9,554,718 B2 | 1/2017 | Bar-Tal et al. |
| D782,686 S | 3/2017 | Werneth et al. |
| 9,585,588 B2 | 3/2017 | Marecki et al. |
| 9,597,036 B2 | 3/2017 | Aeby et al. |
| 9,687,297 B2 | 6/2017 | Just et al. |
| 9,693,733 B2 | 7/2017 | Altmann et al. |
| 9,782,099 B2 | 10/2017 | Williams et al. |
| 9,788,895 B2 | 10/2017 | Solis |
| 9,801,681 B2 | 10/2017 | Laske et al. |
| 9,814,618 B2 | 11/2017 | Nguyen et al. |
| 9,833,161 B2 | 12/2017 | Govari |
| 9,848,795 B2 | 12/2017 | Marecki et al. |
| 9,894,756 B2 | 2/2018 | Weinkam et al. |
| 9,895,073 B2 | 2/2018 | Solis |
| 9,907,609 B2 | 3/2018 | Cao et al. |
| 9,974,460 B2 | 5/2018 | Wu et al. |
| 9,986,949 B2 | 6/2018 | Govari et al. |
| 9,993,160 B2 | 6/2018 | Salvestro et al. |
| 10,014,607 B1 | 7/2018 | Govari et al. |
| 10,028,376 B2 | 7/2018 | Weinkam et al. |
| 10,034,637 B2 | 7/2018 | Harlev et al. |
| 10,039,494 B2 | 8/2018 | Altmann et al. |
| 10,045,707 B2 | 8/2018 | Govari |
| 10,078,713 B2 | 9/2018 | Auerbach et al. |

(56) References Cited

U.S. PATENT DOCUMENTS

| | | |
|---|---|---|
| 10,111,623 B2 | 10/2018 | Jung et al. |
| 10,130,420 B2 | 11/2018 | Basu et al. |
| 10,136,828 B2 | 11/2018 | Houben et al. |
| 10,143,394 B2 | 12/2018 | Solis |
| 10,172,536 B2 | 1/2019 | Maskara et al. |
| 10,182,762 B2 | 1/2019 | Just et al. |
| 10,194,818 B2 | 2/2019 | Williams et al. |
| 10,201,311 B2 | 2/2019 | Chou et al. |
| 10,219,860 B2 | 3/2019 | Harlev et al. |
| 10,219,861 B2 | 3/2019 | Just et al. |
| 10,231,328 B2 | 3/2019 | Weinkam et al. |
| 10,238,309 B2 | 3/2019 | Bar-Tal et al. |
| 10,278,590 B2 | 5/2019 | Salvestro et al. |
| D851,774 S | 6/2019 | Werneth et al. |
| 10,314,505 B2 | 6/2019 | Williams et al. |
| 10,314,507 B2 | 6/2019 | Govari et al. |
| 10,314,648 B2 | 6/2019 | Ge et al. |
| 10,314,649 B2 | 6/2019 | Bakos et al. |
| 10,342,608 B2 | 7/2019 | Wang et al. |
| 10,349,855 B2 | 7/2019 | Zeidan et al. |
| 10,350,003 B2 | 7/2019 | Weinkam et al. |
| 10,362,991 B2 | 7/2019 | Tran et al. |
| 10,375,827 B2 | 8/2019 | Weinkam et al. |
| 10,376,170 B2 | 8/2019 | Quinn et al. |
| 10,376,221 B2 | 8/2019 | Iyun et al. |
| 10,398,348 B2 | 9/2019 | Osadchy et al. |
| 10,403,053 B2 | 9/2019 | Katz et al. |
| 10,441,188 B2 | 10/2019 | Katz et al. |
| 10,470,682 B2 | 11/2019 | Deno et al. |
| 10,470,714 B2 | 11/2019 | Altmann et al. |
| 10,482,198 B2 | 11/2019 | Auerbach et al. |
| 10,492,857 B2 | 12/2019 | Guggenberger et al. |
| 10,542,620 B2 | 1/2020 | Weinkam et al. |
| 10,575,743 B2 | 3/2020 | Basu et al. |
| 10,575,745 B2 | 3/2020 | Solis |
| 10,582,871 B2 | 3/2020 | Williams et al. |
| 10,582,894 B2 | 3/2020 | Ben Zrihem et al. |
| 10,596,346 B2 | 3/2020 | Aeby et al. |
| 10,602,947 B2 | 3/2020 | Govari et al. |
| 10,617,467 B2 | 4/2020 | Viswanathan et al. |
| 10,617,867 B2 | 4/2020 | Viswanathan et al. |
| 10,660,702 B2 | 5/2020 | Viswanathan et al. |
| 10,667,753 B2 | 6/2020 | Werneth et al. |
| 10,674,929 B2 | 6/2020 | Houben et al. |
| 10,681,805 B2 | 6/2020 | Weinkam et al. |
| 10,682,181 B2 | 6/2020 | Cohen et al. |
| 10,687,892 B2 | 6/2020 | Long et al. |
| 10,688,278 B2 | 6/2020 | Beeckler et al. |
| 10,702,178 B2 | 7/2020 | Dahlen et al. |
| 10,716,477 B2 | 7/2020 | Salvestro et al. |
| 10,758,304 B2 | 9/2020 | Aujla |
| 10,765,371 B2 | 9/2020 | Hayam et al. |
| 10,772,566 B2 | 9/2020 | Aujila |
| 10,799,281 B2 | 10/2020 | Goertzen et al. |
| 10,842,558 B2 | 11/2020 | Harlev et al. |
| 10,842,561 B2 | 11/2020 | Viswanathan et al. |
| 10,863,914 B2 | 12/2020 | Govari et al. |
| 10,881,376 B2 | 1/2021 | Shemesh et al. |
| 10,898,139 B2 | 1/2021 | Guta et al. |
| 10,905,329 B2 | 2/2021 | Bar-Tal et al. |
| 10,912,484 B2 | 2/2021 | Ziv-Ari et al. |
| 10,918,306 B2 | 2/2021 | Govari et al. |
| 10,939,871 B2 | 3/2021 | Altmann et al. |
| 10,952,795 B2 | 3/2021 | Cohen et al. |
| 10,973,426 B2 | 4/2021 | Williams et al. |
| 10,973,461 B2 | 4/2021 | Baram et al. |
| 10,987,045 B2 | 4/2021 | Basu et al. |
| 11,006,902 B1 | 5/2021 | Bonyak et al. |
| 11,040,208 B1 | 6/2021 | Govari et al. |
| 11,045,628 B2 | 6/2021 | Beeckler et al. |
| 11,051,877 B2 | 7/2021 | Sliwa et al. |
| 11,071,585 B2 | 7/2021 | Zhang et al. |
| 11,109,788 B2 | 9/2021 | Rottmann et al. |
| 11,116,435 B2 | 9/2021 | Urman et al. |
| 11,129,574 B2 | 9/2021 | Cohen et al. |
| 11,160,482 B2 | 11/2021 | Solis |
| 11,164,371 B2 | 11/2021 | Yellin et al. |
| 2002/0198522 A1 | 12/2002 | Kordis et al. |
| 2004/0210121 A1 | 10/2004 | Fuimaono et al. |
| 2006/0009689 A1 | 1/2006 | Fuimaono et al. |
| 2006/0009690 A1 | 1/2006 | Fuimaono et al. |
| 2006/0058813 A1 | 3/2006 | Teague et al. |
| 2006/0100669 A1 | 5/2006 | Fuimaono et al. |
| 2007/0093806 A1 | 4/2007 | Desai et al. |
| 2007/0276212 A1 | 11/2007 | Fuimaono et al. |
| 2008/0234564 A1 | 9/2008 | Beatty et al. |
| 2010/0063478 A1 | 3/2010 | Selkee |
| 2011/0118726 A1 | 5/2011 | De La Rama et al. |
| 2011/0160574 A1 | 6/2011 | Harlev et al. |
| 2011/0190625 A1 | 8/2011 | Harlev et al. |
| 2011/0245756 A1 | 10/2011 | Arora et al. |
| 2011/0301597 A1 | 12/2011 | McDaniel et al. |
| 2012/0271136 A1 | 10/2012 | Kordis et al. |
| 2012/0271138 A1 | 10/2012 | Kordis et al. |
| 2012/0271140 A1 | 10/2012 | Kordis et al. |
| 2013/0090651 A1 | 4/2013 | Smith |
| 2013/0150693 A1 | 6/2013 | D'Angelo |
| 2013/0172715 A1 | 7/2013 | Just et al. |
| 2013/0172872 A1 | 7/2013 | Subramaniam et al. |
| 2013/0172883 A1 | 7/2013 | Lopes et al. |
| 2013/0178850 A1 | 7/2013 | Lopes et al. |
| 2013/0190587 A1 | 7/2013 | Lopes et al. |
| 2013/0296852 A1 | 11/2013 | Madjarov et al. |
| 2014/0025069 A1 | 1/2014 | Willard et al. |
| 2014/0052118 A1 | 2/2014 | Laske et al. |
| 2014/0180147 A1 | 6/2014 | Thakur et al. |
| 2014/0180151 A1 | 6/2014 | Maskara et al. |
| 2014/0180152 A1 | 6/2014 | Maskara et al. |
| 2014/0257069 A1 | 9/2014 | Eliason et al. |
| 2014/0276712 A1 | 9/2014 | Mallin et al. |
| 2014/0276746 A1 | 9/2014 | Nabutovsky et al. |
| 2014/0288552 A1 | 9/2014 | Kunis |
| 2014/0309512 A1 | 10/2014 | Govari et al. |
| 2014/0309513 A1 | 10/2014 | Fish et al. |
| 2014/0350551 A1 | 11/2014 | Raatikka et al. |
| 2015/0011991 A1 | 1/2015 | Buysman et al. |
| 2015/0045863 A1 | 2/2015 | Litscher et al. |
| 2015/0080693 A1 | 3/2015 | Solis |
| 2015/0105770 A1 | 4/2015 | Amit |
| 2015/0119878 A1 | 4/2015 | Heisel et al. |
| 2015/0133919 A1 | 5/2015 | McDaniel et al. |
| 2015/0208942 A1 | 7/2015 | Bar-Tal et al. |
| 2015/0223757 A1 | 8/2015 | Werneth et al. |
| 2015/0250424 A1 | 9/2015 | Govari et al. |
| 2015/0270634 A1 | 9/2015 | Buesseler et al. |
| 2015/0282859 A1 | 10/2015 | Bencn et al. |
| 2015/0342491 A1 | 12/2015 | Marecki et al. |
| 2015/0342532 A1 | 12/2015 | Basu et al. |
| 2015/0351625 A1 | 12/2015 | Schroth et al. |
| 2015/0366508 A1 | 12/2015 | Chou et al. |
| 2016/0081746 A1 | 3/2016 | Solis |
| 2016/0113582 A1 | 4/2016 | Altmann et al. |
| 2016/0113709 A1 | 4/2016 | Maor |
| 2016/0183877 A1 | 6/2016 | Williams et al. |
| 2016/0228023 A1 | 8/2016 | Govari |
| 2016/0228062 A1 | 8/2016 | Altmann et al. |
| 2016/0278853 A1 | 9/2016 | Ogle et al. |
| 2016/0302858 A1 | 10/2016 | Bencini |
| 2016/0324573 A1 | 11/2016 | Mickelson et al. |
| 2016/0338770 A1 | 11/2016 | Bar-Tal et al. |
| 2017/0027638 A1 | 2/2017 | Solis |
| 2017/0035496 A1 | 2/2017 | Nagale et al. |
| 2017/0065227 A1 | 3/2017 | Marrs et al. |
| 2017/0071543 A1 | 3/2017 | Basu et al. |
| 2017/0071544 A1 | 3/2017 | Basu et al. |
| 2017/0071665 A1 | 3/2017 | Solis |
| 2017/0095173 A1 | 4/2017 | Bar-Tal et al. |
| 2017/0100187 A1 | 4/2017 | Basu et al. |
| 2017/0143227 A1 | 5/2017 | Marecki et al. |
| 2017/0156790 A1 | 6/2017 | Aujla |
| 2017/0164858 A1 | 6/2017 | Basu |
| 2017/0172442 A1 | 6/2017 | Govari |
| 2017/0172651 A1 | 6/2017 | Gross et al. |
| 2017/0185702 A1 | 6/2017 | Auerbach et al. |

(56) References Cited

U.S. PATENT DOCUMENTS

| | | |
|---|---|---|
| 2017/0202515 A1 | 7/2017 | Zrihem et al. |
| 2017/0221262 A1 | 8/2017 | Laughner et al. |
| 2017/0224958 A1 | 8/2017 | Cummings et al. |
| 2017/0265812 A1 | 9/2017 | Williams et al. |
| 2017/0281031 A1 | 10/2017 | Houben et al. |
| 2017/0281268 A1 | 10/2017 | Tran et al. |
| 2017/0296125 A1 | 10/2017 | Altmann et al. |
| 2017/0296251 A1 | 10/2017 | Wu et al. |
| 2017/0319140 A1 | 11/2017 | Wu et al. |
| 2017/0347959 A1 | 12/2017 | Guta et al. |
| 2017/0354338 A1 | 12/2017 | Levin et al. |
| 2017/0354339 A1 | 12/2017 | Zeidan et al. |
| 2017/0354364 A1 | 12/2017 | Bar-Tal et al. |
| 2018/0000540 A1 | 1/2018 | Ogle et al. |
| 2018/0008203 A1 | 1/2018 | Iyun et al. |
| 2018/0028084 A1 | 2/2018 | Williams et al. |
| 2018/0049803 A1 | 2/2018 | Solis |
| 2018/0085064 A1 | 3/2018 | Auerbach et al. |
| 2018/0116595 A1 | 5/2018 | Ruppersberg |
| 2018/0132749 A1 | 5/2018 | Govari et al. |
| 2018/0137687 A1 | 5/2018 | Katz et al. |
| 2018/0160936 A1 | 6/2018 | Govari et al. |
| 2018/0160978 A1 | 6/2018 | Cohen et al. |
| 2018/0168511 A1 | 6/2018 | Hall et al. |
| 2018/0184982 A1 | 7/2018 | Basu et al. |
| 2018/0192958 A1 | 7/2018 | Wu |
| 2018/0192959 A1 | 7/2018 | Mou et al. |
| 2018/0206792 A1 | 7/2018 | Auerbach et al. |
| 2018/0228439 A1 | 8/2018 | Wu et al. |
| 2018/0235692 A1 | 8/2018 | Efimov et al. |
| 2018/0249959 A1 | 9/2018 | Osypka |
| 2018/0256109 A1 | 9/2018 | Wu et al. |
| 2018/0279954 A1 | 10/2018 | Hayam et al. |
| 2018/0303414 A1 | 10/2018 | Toth et al. |
| 2018/0303546 A1 | 10/2018 | Buysman et al. |
| 2018/0310987 A1 | 11/2018 | Altmann et al. |
| 2018/0311497 A1 | 11/2018 | Viswanathan et al. |
| 2018/0338722 A1 | 11/2018 | Altmann et al. |
| 2018/0344188 A1 | 12/2018 | Govari |
| 2018/0344202 A1 | 12/2018 | Bar-Tal et al. |
| 2018/0344251 A1 | 12/2018 | Harlev et al. |
| 2018/0344393 A1 | 12/2018 | Gruba et al. |
| 2018/0360534 A1 | 12/2018 | Teplitsky et al. |
| 2018/0365355 A1 | 12/2018 | Auerbach et al. |
| 2019/0000540 A1 | 1/2019 | Cohen et al. |
| 2019/0008582 A1 | 1/2019 | Govari et al. |
| 2019/0015007 A1 | 1/2019 | Rottmann et al. |
| 2019/0030328 A1 | 1/2019 | Stewart et al. |
| 2019/0053708 A1 | 2/2019 | Gliner |
| 2019/0059766 A1 | 2/2019 | Houben et al. |
| 2019/0069950 A1 | 3/2019 | Viswanathan et al. |
| 2019/0069954 A1 | 3/2019 | Cohen et al. |
| 2019/0117111 A1 | 4/2019 | Osadchy et al. |
| 2019/0117303 A1 | 4/2019 | Claude et al. |
| 2019/0117315 A1 | 4/2019 | Keyes et al. |
| 2019/0125338 A1 | 5/2019 | Shelton, IV et al. |
| 2019/0125437 A1 | 5/2019 | Govari et al. |
| 2019/0125439 A1 | 5/2019 | Rohl et al. |
| 2019/0133552 A1 | 5/2019 | Shemesh et al. |
| 2019/0142293 A1 | 5/2019 | Solis |
| 2019/0164633 A1 | 5/2019 | Ingel et al. |
| 2019/0167137 A1 | 6/2019 | Bar-Tal et al. |
| 2019/0167140 A1 | 6/2019 | Williams et al. |
| 2019/0188909 A1 | 6/2019 | Yellin et al. |
| 2019/0201664 A1 | 7/2019 | Govari |
| 2019/0209089 A1 | 7/2019 | Baram et al. |
| 2019/0216346 A1 | 7/2019 | Ghodrati et al. |
| 2019/0216347 A1 | 7/2019 | Ghodrati et al. |
| 2019/0231421 A1 | 8/2019 | Viswanathan et al. |
| 2019/0231423 A1 | 8/2019 | Weinkam et al. |
| 2019/0239811 A1 | 8/2019 | Just et al. |
| 2019/0246935 A1 | 8/2019 | Govari et al. |
| 2019/0298442 A1 | 10/2019 | Ogata et al. |
| 2019/0314083 A1 | 10/2019 | Herrera et al. |
| 2019/0328260 A1 | 10/2019 | Zeidan et al. |
| 2019/0336210 A1 | 11/2019 | Beeckler et al. |
| 2019/0343580 A1 | 11/2019 | Nguyen et al. |
| 2019/0350567 A1 | 11/2019 | Cummins et al. |
| 2020/0000518 A1 | 1/2020 | Kiernan et al. |
| 2020/0008705 A1 | 1/2020 | Ziv-Ari et al. |
| 2020/0008869 A1 | 1/2020 | Byrd |
| 2020/0009378 A1 | 1/2020 | Stewart et al. |
| 2020/0015890 A1 | 1/2020 | To et al. |
| 2020/0022653 A1 | 1/2020 | Moisa |
| 2020/0029845 A1 | 1/2020 | Baram et al. |
| 2020/0046421 A1 | 2/2020 | Govari |
| 2020/0046423 A1 | 2/2020 | Viswanathan et al. |
| 2020/0060569 A1 | 2/2020 | Tegg |
| 2020/0077959 A1 | 3/2020 | Altmann et al. |
| 2020/0093539 A1 | 3/2020 | Long et al. |
| 2020/0129089 A1 | 4/2020 | Gliner et al. |
| 2020/0129125 A1 | 4/2020 | Govari et al. |
| 2020/0129128 A1 | 4/2020 | Gliner et al. |
| 2020/0179650 A1 | 6/2020 | Beeckler et al. |
| 2020/0196896 A1 | 6/2020 | Solis |
| 2020/0205689 A1 | 7/2020 | Squires et al. |
| 2020/0205690 A1 | 7/2020 | Williams et al. |
| 2020/0205737 A1 | 7/2020 | Beeckler |
| 2020/0205876 A1 | 7/2020 | Govari |
| 2020/0205892 A1 | 7/2020 | Viswanathan et al. |
| 2020/0206461 A1 | 7/2020 | Govari et al. |
| 2020/0206498 A1 | 7/2020 | Arora et al. |
| 2020/0289197 A1 | 9/2020 | Viswanathan et al. |
| 2020/0297234 A1 | 9/2020 | Houben et al. |
| 2020/0297281 A1 | 9/2020 | Basu et al. |
| 2020/0305726 A1 | 10/2020 | Salvestro et al. |
| 2020/0305946 A1 | 10/2020 | Desimone et al. |
| 2020/0375657 A1 | 12/2020 | Olson et al. |
| 2020/0397328 A1 | 12/2020 | Altmann et al. |
| 2020/0398048 A1 | 12/2020 | Krimsky et al. |
| 2021/0015549 A1 | 1/2021 | Haghighi-Mood et al. |
| 2021/0022684 A1 | 1/2021 | Govari et al. |
| 2021/0045805 A1 | 2/2021 | Govari et al. |
| 2021/0059549 A1 | 3/2021 | Urman et al. |
| 2021/0059550 A1 | 3/2021 | Urman et al. |
| 2021/0059608 A1 | 3/2021 | Beeckler et al. |
| 2021/0059743 A1 | 3/2021 | Govari |
| 2021/0059747 A1 | 3/2021 | Krans et al. |
| 2021/0077184 A1 | 3/2021 | Basu et al. |
| 2021/0082157 A1 | 3/2021 | Rosenberg et al. |
| 2021/0085200 A1 | 3/2021 | Auerbach et al. |
| 2021/0085204 A1 | 3/2021 | Auerbach et al. |
| 2021/0085215 A1 | 3/2021 | Auerbach et al. |
| 2021/0085387 A1 | 3/2021 | Amit et al. |
| 2021/0093292 A1 | 4/2021 | Baram et al. |
| 2021/0093294 A1 | 4/2021 | Shemesh et al. |
| 2021/0093374 A1 | 4/2021 | Govari et al. |
| 2021/0093377 A1 | 4/2021 | Herrera et al. |
| 2021/0100612 A1 | 4/2021 | Baron et al. |
| 2021/0113822 A1 | 4/2021 | Beeckler et al. |
| 2021/0127999 A1 | 5/2021 | Govari et al. |
| 2021/0128010 A1 | 5/2021 | Govari et al. |
| 2021/0133516 A1 | 5/2021 | Govari et al. |
| 2021/0145282 A1 | 5/2021 | Bar-Tal et al. |
| 2021/0161582 A1 | 6/2021 | Byrd et al. |
| 2021/0161592 A1 | 6/2021 | Altmann et al. |
| 2021/0162210 A1 | 6/2021 | Altmann et al. |
| 2021/0169421 A1 | 6/2021 | Govari |
| 2021/0169550 A1 | 6/2021 | Govari et al. |
| 2021/0169567 A1 | 6/2021 | Govari et al. |
| 2021/0169568 A1 | 6/2021 | Govari et al. |
| 2021/0177294 A1 | 6/2021 | Gliner et al. |
| 2021/0177356 A1 | 6/2021 | Gliner et al. |
| 2021/0177503 A1 | 6/2021 | Altmann et al. |
| 2021/0178166 A1 | 6/2021 | Govari et al. |
| 2021/0186363 A1 | 6/2021 | Gliner et al. |
| 2021/0186604 A1 | 6/2021 | Altmann et al. |
| 2021/0187241 A1 | 6/2021 | Govari et al. |
| 2021/0187254 A1 | 6/2021 | Beeckler et al. |
| 2021/0196372 A1 | 7/2021 | Altmann et al. |
| 2021/0196394 A1 | 7/2021 | Govari et al. |
| 2021/0212591 A1 | 7/2021 | Govari et al. |
| 2021/0219904 A1 | 7/2021 | Yarnitsky et al. |
| 2021/0236815 A1 | 8/2021 | Waldstreicher et al. |

(56) References Cited

U.S. PATENT DOCUMENTS

| | | |
|---|---|---|
| 2021/0278936 A1 | 9/2021 | Katz et al. |
| 2021/0282659 A1 | 9/2021 | Govari et al. |
| 2021/0307815 A1 | 10/2021 | Govari et al. |
| 2021/0308424 A1 | 10/2021 | Beeckler et al. |
| 2021/0338319 A1 | 11/2021 | Govari et al. |
| 2021/0369339 A1 | 12/2021 | Salazar et al. |
| 2022/0071695 A1 | 3/2022 | Beeckler et al. |
| 2022/0071696 A1 | 3/2022 | Govari et al. |
| 2022/0110679 A1 | 4/2022 | Wang et al. |
| 2022/0304745 A1 | 9/2022 | Olson |
| 2022/0387051 A1 | 12/2022 | Girdhar et al. |
| 2023/0000550 A1 | 1/2023 | Nedved et al. |
| 2023/0130692 A1 | 4/2023 | Wang et al. |
| 2023/0225790 A1 | 7/2023 | Okarski |
| 2023/0346455 A1 | 11/2023 | Beeckler et al. |
| 2023/0346459 A1 | 11/2023 | Beeckler et al. |
| 2023/0346462 A1 | 11/2023 | Beeckler et al. |
| 2023/0346464 A1 | 11/2023 | Beeckler et al. |
| 2024/0216045 A1 | 7/2024 | Keyes |
| 2025/0057589 A1 | 2/2025 | Sandquist et al. |

FOREIGN PATENT DOCUMENTS

| | | |
|---|---|---|
| CN | 111248996 A | 6/2020 |
| EP | 0668740 A1 | 8/1995 |
| EP | 0644738 B1 | 3/2000 |
| EP | 0727183 B1 | 11/2002 |
| EP | 0727184 B1 | 12/2002 |
| EP | 2201905 A1 | 6/2010 |
| EP | 2783651 A1 | 10/2014 |
| EP | 2699151 B1 | 11/2015 |
| EP | 2699152 B1 | 11/2015 |
| EP | 2699153 B1 | 12/2015 |
| EP | 2498706 B1 | 4/2016 |
| EP | 2578173 B1 | 6/2017 |
| EP | 3181082 A1 | 6/2017 |
| EP | 3238645 A1 | 11/2017 |
| EP | 2884931 B1 | 1/2018 |
| EP | 3315086 A1 | 5/2018 |
| EP | 2349440 B1 | 8/2019 |
| EP | 3318211 B1 | 12/2019 |
| EP | 3581135 A1 | 12/2019 |
| EP | 2736434 B1 | 2/2020 |
| EP | 3451962 B1 | 3/2020 |
| EP | 3791816 A2 | 3/2021 |
| EP | 3972510 A1 | 3/2022 |
| EP | 4115834 A1 | 1/2023 |
| WO | 9421167 A1 | 9/1994 |
| WO | 9421169 A1 | 9/1994 |
| WO | 9625095 A1 | 8/1996 |
| WO | 9634560 A1 | 11/1996 |
| WO | 0182814 B1 | 5/2002 |
| WO | 2004087249 A2 | 10/2004 |
| WO | 2012100185 A2 | 7/2012 |
| WO | 2013052852 A1 | 4/2013 |
| WO | 2013162884 A1 | 10/2013 |
| WO | 2013173917 A1 | 11/2013 |
| WO | 2013176881 A1 | 11/2013 |
| WO | 2014176205 A1 | 10/2014 |
| WO | 2016019760 A1 | 2/2016 |
| WO | 2016044687 A1 | 3/2016 |
| WO | 2018111600 A1 | 6/2018 |
| WO | 2018191149 A1 | 10/2018 |
| WO | 2019084442 A1 | 5/2019 |
| WO | 2019143960 A1 | 7/2019 |
| WO | 2020026217 A1 | 2/2020 |
| WO | 2020194216 A1 | 10/2020 |
| WO | 2020206328 A1 | 10/2020 |
| WO | 2022001908 A1 | 1/2022 |

OTHER PUBLICATIONS

Extended European Search Report dated Feb. 2, 2023, from Corresponding European Application No. 22194819.3, 8 pages.
Extended European Search Report and Opinion dated Jun. 1, 2023, from corresponding European Application No. 23152493.5.
Extended European Search Report and Opinion dated Jun. 7, 2023, from corresponding European Application No. 23152399.4.
Extended European Search Report and Opinion dated Jun. 12, 2023, from corresponding European Application No. 23152448.9.
Extended European Search Report dated Jun. 13, 2023, from Corresponding European Application No. 23152458.8, 12 pages.
Extended European Search Report and Opinion dated Sep. 6, 2023, from corresponding European Application No. 23152472.9.
Extended European Search Report & Opinion dated Sep. 19, 2023, from corresponding European Application No. 23170233.3.
Extended European Search Report & Search Opinion dated Sep. 19, 2023, from corresponding European Application No. 23170325.7.
Extended European Search Report & Search Opinion dated Sep. 21, 2023, from corresponding European Application No. 23170230.9.
Extended European Search Report & Search Opinion dated Sep. 21, 2023, from corresponding European Application No. 23170409.9.
Extended European Search Report & Search Opinion dated Jan. 2, 2024, from corresponding European Application No. 23170297.8.

* cited by examiner

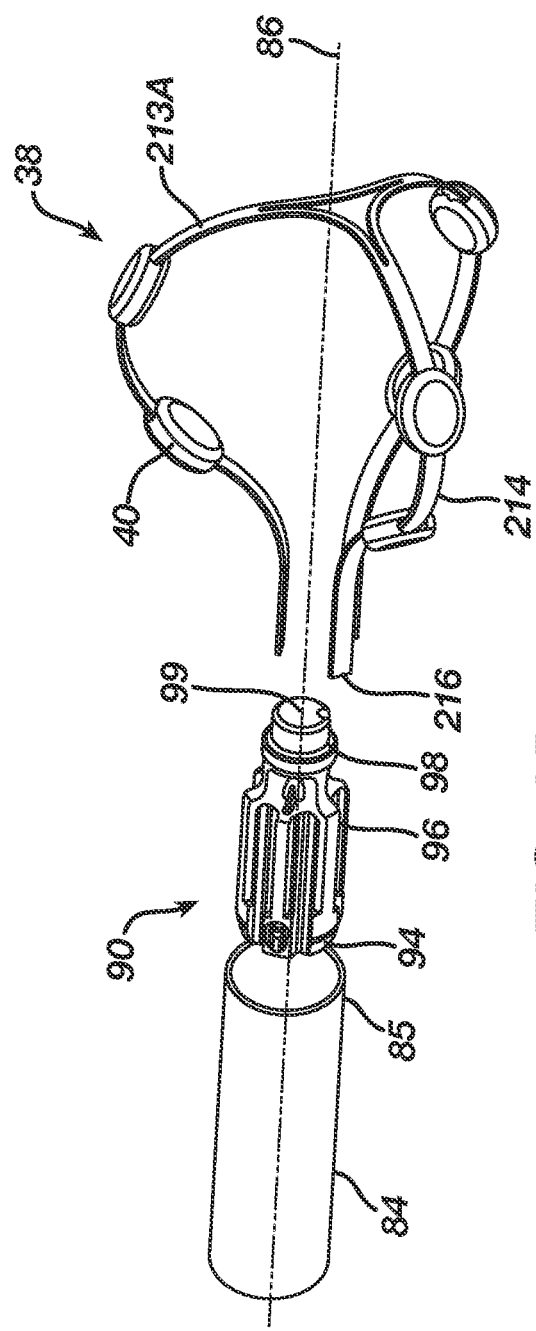
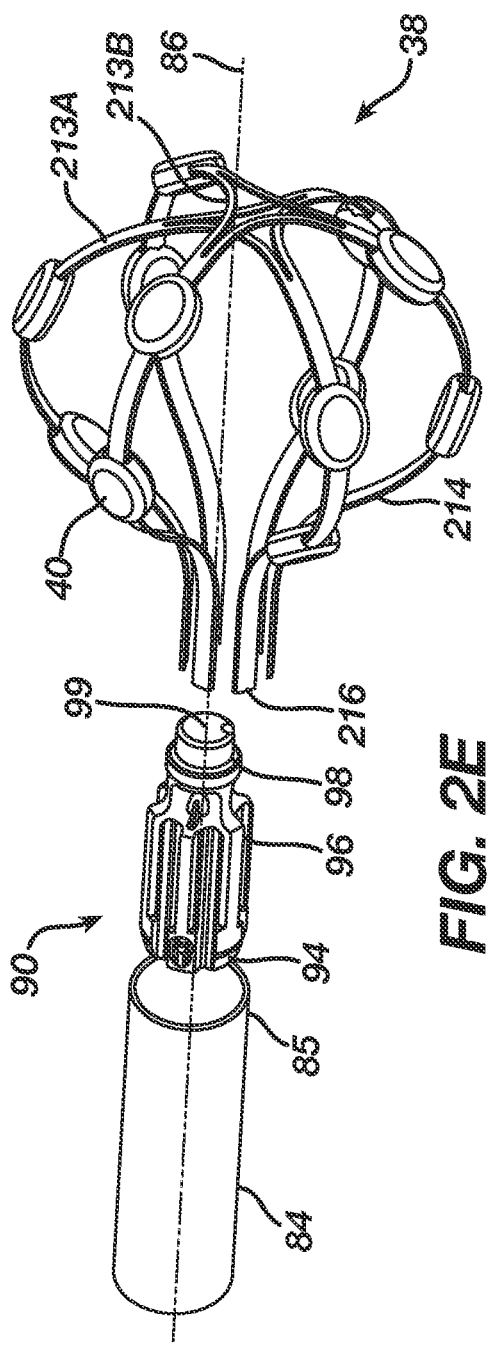
FIG. 2D
FIG. 2E

SYSTEMS AND METHODS FOR TRIPODIC SPINES FORMING A SPHERICAL BASKET FOR IMPROVED TISSUE CONTACT AND CURRENT DELIVERY

CROSS REFERENCE TO RELATED APPLICATIONS

This application claims the benefit of priority under 35 U.S.C. § 119 to prior filed U.S. Provisional Patent Application No. 63/301,180, filed on Jan. 20, 2022, the entire contents of which is hereby incorporated by reference as if set forth in full herein.

FIELD

The present invention relates generally to medical devices, and in particular catheters with electrodes, and further relates to, but not exclusively, catheters suitable for use to induce irreversible electroporation (IRE) of cardiac tissues.

BACKGROUND

Cardiac arrhythmias, such as atrial fibrillation (AF), occur when regions of cardiac tissue abnormally conduct electric signals to adjacent tissue. This disrupts the normal cardiac cycle and causes asynchronous rhythm. Certain procedures exist for treating arrhythmia, including surgically disrupting the origin of the signals causing the arrhythmia and disrupting the conducting pathway for such signals. By selectively ablating cardiac tissue by application of energy via a catheter, it is sometimes possible to cease or modify the propagation of unwanted electrical signals from one portion of the heart to another.

Many current ablation approaches in the art tend to utilize radiofrequency (RF) electrical energy to heat tissue. RF ablation can have certain rare drawbacks due to operator's skill, such as heightened risk of thermal cell injury which can lead to tissue charring, burning, steam pop, phrenic nerve palsy, pulmonary vein stenosis, and esophageal fistula. Cryoablation is an alternative approach to RF ablation that generally reduces thermal risks associated with RF ablation but may present tissue damage due to the very low temperature nature of such devices. Maneuvering cryoablation devices and selectively applying cryoablation, however, is generally more challenging compared to RF ablation; therefore cryoablation is not viable in certain anatomical geometries which may be reached by electrical ablation devices.

Some ablation approaches use irreversible electroporation (IRE) to ablate cardiac tissue using nonthermal ablation methods. IRE delivers short pulses of high voltage to tissues and generates an unrecoverable permeabilization of cell membranes. Delivery of IRE energy to tissues using multi-electrode catheters was previously proposed in the patent literature. Examples of systems and devices configured for IRE ablation are disclosed in U.S. Patent Pub. No. 2021/0169550A1, 2021/0169567A1, 2021/0169568A1, 2021/0161592A1, 2021/0196372A1, 2021/0177503A1, and 2021/0186604A1, each of which are incorporated herein by reference and attached in the appendix to priority application U.S. 63/301,180.

Regions of cardiac tissue can be mapped by a catheter to identify the abnormal electrical signals. The same or different catheter can be used to perform ablation. Some example catheters include a number of spines with electrodes positioned thereon. The electrodes are generally attached to the spines and secured in place by soldering, welding, or using an adhesive. Furthermore, tripodic structures including three spines are generally assembled together by attaching ends of the three spines to a tubular shaft (e.g., a pusher tube) to form a spherical basket. Due to the small size of the spines and the electrodes, however, adhering the electrodes to the spines and then forming a spherical basket from two or more tripodic structures can be a difficult task, increasing the manufacturing time and cost and the chances that the electrode fails due to an improper bond or misalignment. What is needed, therefore, are devices and methods of forming an improved basket assembly that can help to reduce the time required for manufacturing the basket assembly and alternative basket assembly geometries in general.

SUMMARY

Various embodiments of a medical probe and related methods are described and illustrated. The medical probe may include a tubular shaft, an expandable basket assembly, and one or more electrodes. The tubular shaft can have a proximal end and a distal end. The tubular shaft can extend along a longitudinal axis. The expandable basket assembly can be proximate the distal end of the tubular shaft. The basket assembly can include a first unitary tripodic structure and a second unitary tripodic structure. Each tripodic structure can be formed from a respective planar sheet of material that includes three linear spines converging at a respective central spine intersection. Each spine of each tripodic structure can have a respective end connected to the distal end of the tubular shaft. The central spine intersection of each tripodic structure can be positioned on the longitudinal axis at a distal end of the basket assembly. The one or more electrodes can be coupled to each of the spines. Each electrode can define a lumen through the electrode so that the spine extends through the lumen of each of the one or more electrodes.

The disclosed technology can include a method of constructing a medical probe. The method can include cutting a first sheet of planar material to form a first structure comprising three spines including a first central spine intersection; cutting a second sheet of planar material to form a second structure comprising three spines including a second central spine intersection; overlapping the central spine intersections of the first and second structures; inserting each spine of the respective structure into a lumen of at least electrode; and fitting ends of the spines of the respective structure to a tubular shaft sized to traverse vasculature such that the central spine intersections are positioned at a distal end of the medical probe and respective spines are movable from a tubular configuration to a bowed configuration.

BRIEF DESCRIPTION OF THE DRAWINGS

FIGS. 2D and 2E are schematic pictorial illustrations showing exploded side views of a medical probe, in accordance with an embodiment of the present invention;

DETAILED DESCRIPTION

Figure 1:
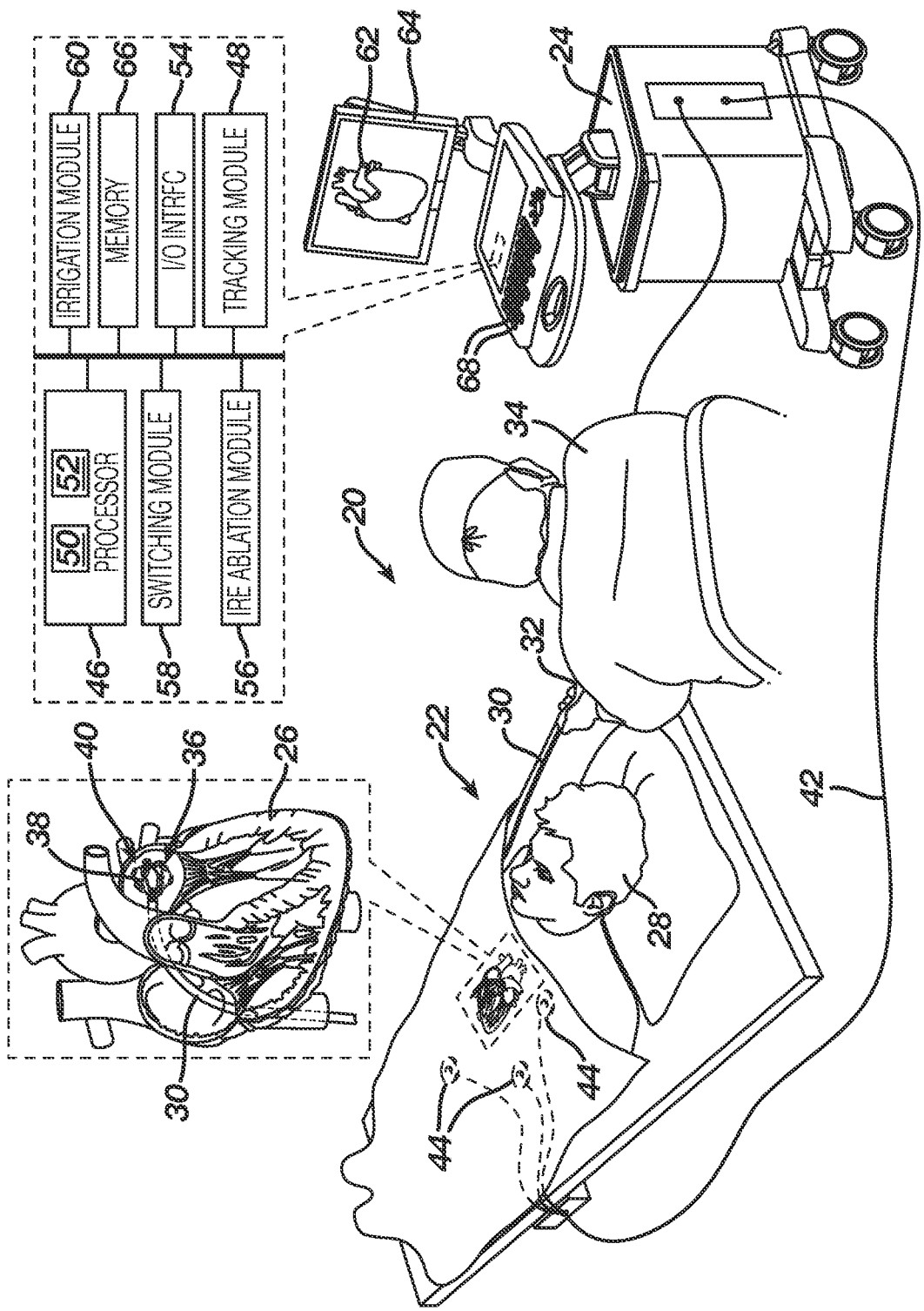
FIG. 1 is a schematic pictorial illustration of a medical system including a medical probe whose distal end has a basket assembly with electrodes, in accordance with an embodiment of the present invention.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 71% to 110%.

As used herein, the terms "patient," "host." "user," and "subject" refer to any human or animal subject and are not intended to limit the systems or methods to human use, although use of the subject invention in a human patient represents a preferred embodiment. In addition, vasculature of a "patient," "host," "user," and "subject" can be vasculature of a human or any animal. It should be appreciated that an animal can be a variety of any applicable type, including, but not limited thereto, mammal, veterinarian animal, livestock animal or pet type animal, etc. As an example, the animal can be a laboratory animal specifically selected to have certain characteristics similar to a human (e.g., rat, dog, pig, monkey, or the like). It should be appreciated that the subject can be any applicable human patient, for example. As well, the term "proximal" indicates a location closer to the operator or physician whereas "distal" indicates a location further away to the operator or physician.

As discussed herein, "operator" can include a doctor, surgeon, technician, scientist, or any other individual or delivery instrumentation associated with delivery of a multi-electrode catheter for the treatment of drug refractory atrial fibrillation to a subject.

As discussed herein, the term "ablate" or "ablation", as it relates to the devices and corresponding systems of this disclosure, refers to components and structural features configured to reduce or prevent the generation of erratic cardiac signals in the cells by utilizing non-thermal energy, such as irreversible electroporation (IRE), referred throughout this disclosure interchangeably as pulsed electric field (PEF) and pulsed field ablation (PFA). Ablating or ablation as it relates to the devices and corresponding systems of this disclosure is used throughout this disclosure in reference to non-thermal ablation of cardiac tissue for certain conditions including, but not limited to, arrhythmias, atrial flutter ablation, pulmonary vein isolation, supraventricular tachycardia ablation, and ventricular tachycardia ablation. The term "ablate" or "ablation" also includes known methods, devices, and systems to achieve various forms of bodily tissue ablation as understood by a person skilled in the relevant art.

As discussed herein, the terms "bipolar" and "unipolar" when used to refer to ablation schemes describe ablation schemes which differ with respect to electrical current path and electric field distribution. "Bipolar" refers to ablation scheme utilizing a current path between two electrodes that are both positioned at a treatment site; current density and electric flux density is typically approximately equal at each of the two electrodes. "Unipolar" refers to ablation scheme utilizing a current path between two electrodes where one electrode including a high current density and high electric flux density is positioned at a treatment site, and a second electrode including comparatively lower current density and lower electric flux density is positioned remotely from the treatment site.

As discussed herein, the terms "biphasic pulse" and "monophasic pulse" refer to respective electrical signals. "Biphasic pulse" refers to an electrical signal including a positive-voltage phase pulse (referred to herein as "positive phase") and a negative-voltage phase pulse (referred to herein as "negative phase"). "Monophasic pulse" refers to an electrical signal including only a positive or only a negative phase. Preferably, a system providing the biphasic pulse is configured to prevent application of a direct current voltage (DC) to a patient. For instance, the average voltage of the biphasic pulse can be zero volts with respect to ground or other common reference voltage. Additionally, or alternatively, the system can include a capacitor or other protective component. Where voltage amplitude of the biphasic and/or monophasic pulse is described herein, it is understood that the expressed voltage amplitude is an absolute value of the approximate peak amplitude of each of the positive-voltage phase and/or the negative-voltage phase. Each phase of the biphasic and monophasic pulse preferably has a square shape including an essentially constant voltage amplitude during a majority of the phase duration. Phases of the biphasic pulse are separated in time by an interphase delay. The interphase delay duration is preferably less than or approximately equal to the duration of a phase of the biphasic pulse. The interphase delay duration is more preferably about 25% of the duration of the phase of the biphasic pulse.

As discussed herein, the terms "tubular" and "tube" are to be construed broadly and are not limited to a structure that is a right cylinder or strictly circumferential in cross-section or of a uniform cross-section throughout its length. For example, the tubular structures are generally illustrated as a substantially right cylindrical structure. However, the tubular structures may have a tapered or curved outer surface without departing from the scope of the present disclosure.

The term "temperature rating", as used herein, is defined as the maximum continuous temperature that a component can withstand during its lifetime without causing thermal damage, such as melting or thermal degradation (e.g., charring and crumbling) of the component.

The present disclosure is related to systems, methods or uses and devices which utilize end effectors including electrodes affixed to spines. Example systems, methods, and devices of the present disclosure may be particularly suited for IRE ablation of cardiac tissue to treat cardiac arrhythmias. Ablative energies are typically provided to cardiac tissue by a tip portion of a catheter which can deliver ablative energy alongside the tissue to be ablated. Some example catheters include three-dimensional structures at the tip portion and are configured to administer ablative energy from various electrodes positioned on the three-dimensional structures. Ablative procedures incorporating such example catheters can be visualized using fluoroscopy.

Ablation of cardiac tissue using application of a thermal technique, such as radio frequency (RF) energy and cryoablation, to correct a malfunctioning heart is a well-known procedure. Typically, to successfully ablate using a thermal technique, cardiac electropotentials need to be measured at various locations of the myocardium. In addition, temperature measurements during ablation provide data enabling the efficacy of the ablation. Typically, for an ablation procedure using a thermal technique, the electropotentials and the temperatures are measured before, during, and after the actual ablation.

RF approaches can have risks that can lead to tissue charring, burning, steam pop, phrenic nerve palsy, pulmonary vein stenosis, and esophageal fistula. Cryoablation is an alternative approach to RF ablation that can reduce some thermal risks associated with RF ablation. However maneuvering cryoablation devices and selectively applying cryoablation is generally more challenging compared to RF ablation; therefore, cryoablation is not viable in certain anatomical geometries which may be reached by electrical ablation devices.

IRE as discussed in this disclosure is a non-thermal cell death technology that can be used for ablation of atrial arrhythmias. To ablate using IRE/PEF, biphasic voltage pulses are applied to disrupt cellular structures of myocardium. The biphasic pulses are non-sinusoidal and can be tuned to target cells based on electrophysiology of the cells. In contrast, to ablate using RF, a sinusoidal voltage waveform is applied to produce heat at the treatment area, indiscriminately heating all cells in the treatment area. IRE therefore has the capability to spare adjacent heat sensitive structures or tissues which would be of benefit in the reduction of possible complications known with ablation or isolation modalities. Additionally, or alternatively, monophasic pulses can be utilized.

Electroporation can be induced by applying a pulsed electric field across biological cells to cause reversable (temporary) or irreversible (permanent) creation of pores in the cell membrane. The cells have a transmembrane electrostatic potential that is increased above a resting potential upon application of the pulsed electric field. While the transmembrane electrostatic potential remains below a threshold potential, the electroporation is reversable, meaning the pores can close when the applied pulse electric field is removed, and the cells can self-repair and survive. If the transmembrane electrostatic potential increases beyond the threshold potential, the electroporation is irreversible, and the cells become permanently permeable. As a result, the cells die due to a loss of homeostasis and typically die by programmed cell death or apoptosis, which is believed to leave less scar tissue as compared to other ablation modalities. Generally, cells of differing types have differing threshold potential. For instance, heart cells have a threshold potential of approximately 500 V/cm, whereas for bone it is 3000 V/cm. These differences in threshold potential allow IRE to selectively target tissue based on threshold potential.

The solution of this disclosure includes systems and methods for applying electrical signals from catheter electrodes positioned in the vicinity of myocardial tissue, preferably by applying a pulsed electric field effective to induce electroporation in the myocardial tissue. The systems and methods can be effective to ablate targeted tissue by inducing irreversible electroporation. In some examples, the systems and methods can be effective to induce reversible electroporation as part of a diagnostic procedure. Reversible electroporation occurs when the electricity applied with the electrodes is below the electric field threshold of the target tissue allowing cells to repair. Reversible electroporation does not kill the cells but allows a physician to see the effect of reversible electroporation on electrical activation signals in the vicinity of the target location. Example systems and methods for reversible electroporation is disclosed in U.S. Patent Publication 2021/0162210, the entirety of which is incorporated herein by reference and attached in the appendix to priority application U.S. 63/301,180.

The pulsed electric field, and its effectiveness to induce reversible and/or irreversible electroporation, can be affected by physical parameters of the system and biphasic pulse parameters of the electrical signal. Physical parameters can include electrode contact area, electrode spacing, electrode geometry, etc. examples presented herein generally include physical parameters adapted to effectively induce reversible and/or irreversible electroporation. Biphasic pulse parameters of the electrical signal can include voltage amplitude, pulse duration, pulse interphase delay, inter-pulse delay, total application time, delivered energy, etc. In some examples, parameters of the electrical signal can be adjusted to induce both reversible and irreversible electroporation given the same physical parameters. Examples of various systems and methods of ablation including IRE are presented in U.S. Patent Publications 2021/0169550A1, 2021/0169567A1, 2021/0169568A1, 2021/0161592A1, 2021/0196372A1, 2021/0177503A1, and 2021/0186604A1, the entireties of each of which are incorporated herein by reference and attached in the appendix to priority application U.S. 63/301,180.

To deliver pulsed field ablation (PFA) in an IRE (irreversible electroporation) procedure, electrodes should contact the tissue being ablated with a sufficiently large surface area. As described hereinbelow, the medical probe includes a tubular shaft including proximal and distal ends, and a basket assembly at the distal end of the tubular shaft. The basket assembly includes at least one tripodic structure including three linear spines converging at a central intersection and including one or more electrodes coupled to each of the spines. The linear spines can bend to form an approximately spherical or oblate-spheroid basket assembly.

FIG. 1 is a schematic, pictorial illustration of a medical system 20 including a medical probe 22 and a control console 24, in accordance with an embodiment of the present invention. Medical system 20 may be based, for example, on the CARTO® system, produced by Biosense Webster Inc. of 31 Technology Drive, Suite 200, Irvine, CA 92618 USA. In embodiments described hereinbelow, medical probe 22 can be used for diagnostic or therapeutic treatment, such as for performing ablation procedures in a heart 26 of a patient 28. Alternatively, medical probe 22 may be used, mutatis mutandis, for other therapeutic and/or diagnostic purposes in the heart or in other body organs.

Medical probe 22 includes a flexible insertion tube 30 and a handle 32 coupled to a proximal end of the tubular shaft. During a medical procedure, a medical professional 34 can insert probe 22 through the vascular system of patient 28 so that a distal end 36 of the medical probe enters a body cavity such as a chamber of heart 26. Upon distal end 36 entering the chamber of heart 26, medical professional 34 can deploy a basket assembly 38 approximate a distal end 36 of the medical probe 22. Basket assembly 38 can include a plurality of electrodes 40 affixed to a plurality of spines 214, as described in the description referencing FIGS. 2A and 2B hereinbelow. To start performing a medical procedure such as irreversible electroporation (IRE) ablation, medical professional 34 can manipulate handle 32 to position distal end 36 so that electrodes 40 engage cardiac tissue at a desired location or locations. Upon positioning the distal end 36 so that electrodes 40 engages cardiac tissue, the medical professional 34 can activate the medical probe 22 such that electrical pulses are delivered by the electrodes 40 to perform the IRE ablation.

The medical probe 22 can include a guide sheath and a therapeutic catheter, wherein the guide sheath includes the flexible insertion tube 30 and the handle 32 and the therapeutic catheter includes the basket assembly 38, electrodes 40, and a tubular shaft 84 (see FIGS. 2A through 2E). The therapeutic catheter is translated through the guide sheath so that the basket assembly 38 is positioned in the heart 26. The distal end 36 of the medical probe 22 corresponds to a distal end of the guide sheath when the basket assembly 38 is contained within the flexible insertion tube 30, and the distal end 36 of the medical probe 22 corresponds to a distal end of the basket assembly 38 when the basket assembly 38 is extended from the distal end of the guide sheath. The medical probe 22 can be alternatively configured to include a second handle on the therapeutic catheter and other features as understood by a person skilled in the pertinent art.

In the configuration shown in FIG. 1, control console 24 is connected, by a cable 42, to body surface electrodes, which typically include adhesive skin patches 44 that are affixed to patient 28. Control console 24 includes a processor 46 that, in conjunction with a tracking module 48, determines location coordinates of distal end 36 inside heart 26. Location coordinates can be determined based on electromagnetic position sensor output signals provided from the distal portion of the catheter when in the presence of a generated magnetic field. Location coordinates can additionally, or alternatively be based on impedances and/or currents measured between adhesive skin patches 44 and electrodes 40 that are affixed to basket assembly 38. In addition to being used as location sensors during a medical procedure, electrodes 40 may perform other tasks such as ablating tissue in the heart.

As described hereinabove, in conjunction with tracking module 48, processor 46 may determine location coordinates of distal end 36 inside heart 26 based on impedances and/or currents measured between adhesive skin patches 44 and electrodes 40. Such a determination is typically after a calibration process relating the impedances or currents to known locations of the distal end has been performed. While embodiments presented herein describe electrodes 40 that are preferably configured to deliver IRE ablation energy to tissue in heart 26, configuring electrodes 40 to deliver any other type of ablation energy to tissue in any body cavity is considered to be within the spirit and scope of the present invention. Furthermore, although described in the context of being electrodes 40 that are configured to deliver IRE ablation energy to tissue in the heart 26, one skilled in the art will appreciate that the disclosed technology can be applicable to electrodes used for mapping and/or determining various characteristics of an organ or other part of the patient's 28 body.

Processor 46 may include real-time noise reduction circuitry 50 typically configured as a field programmable gate array (FPGA), followed by an analog-to-digital (A/D) signal conversion integrated circuit 52. The processor can be programmed to perform one or more algorithms and uses circuitry 50 and circuit 52 as well as features of modules to enable the medical professional 34 to perform the IRE ablation procedure.

Control console 24 also includes an input/output (I/O) communications interface 54 that enables control console 24 to transfer signals from, and/or transfer signals to electrodes 40 and adhesive skin patches 44. In the configuration shown in FIG. 1, control console 24 additionally includes an IRE ablation module 56 and a switching module 58.

IRE ablation module 56 is configured to generate IRE pulses including peak power in the range of tens of kilowatts. In some examples, the electrodes 40 are configured to deliver electrical pulses including a peak voltage of at least 900 volts (V). The medical system 20 performs IRE ablation by delivering IRE pulses to electrodes 40. Preferably, the medical system 20 delivers biphasic pulses between electrodes 40 on the spine. Additionally, or alternatively, the medical system 20 delivers monophasic pulses between at least one of the electrodes 40 and a skin patch.

Figure 2A:
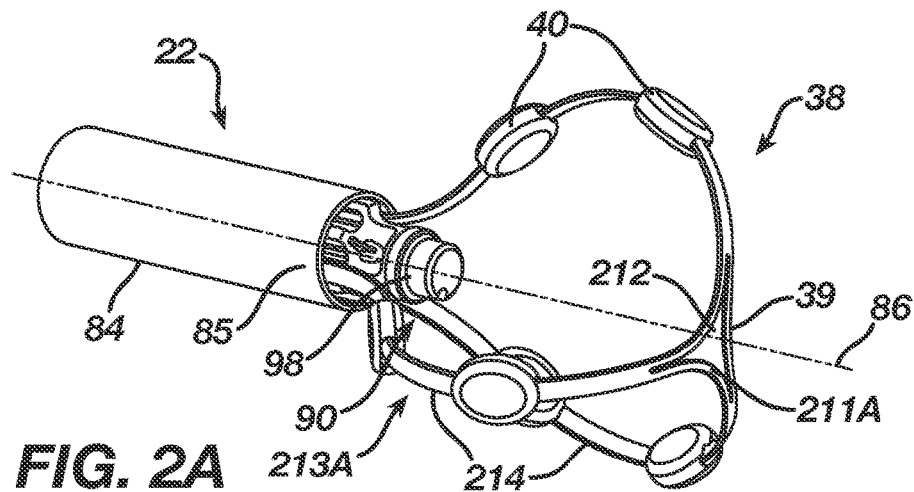
FIGS. 2A and 2B are schematic pictorial illustrations showing perspective views of a medical probe in an expanded form, in accordance with an embodiment of the present invention.
Figure 2B:
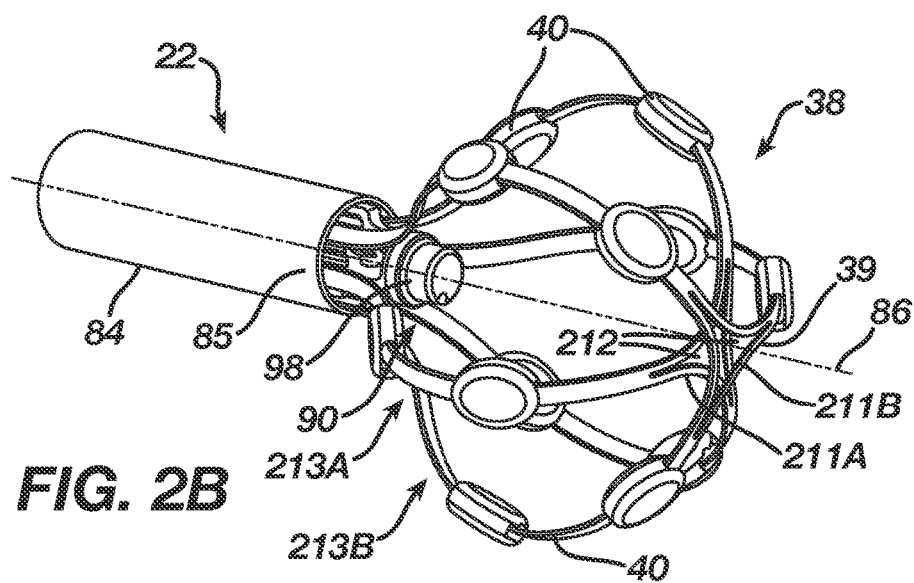
Figure 2C:
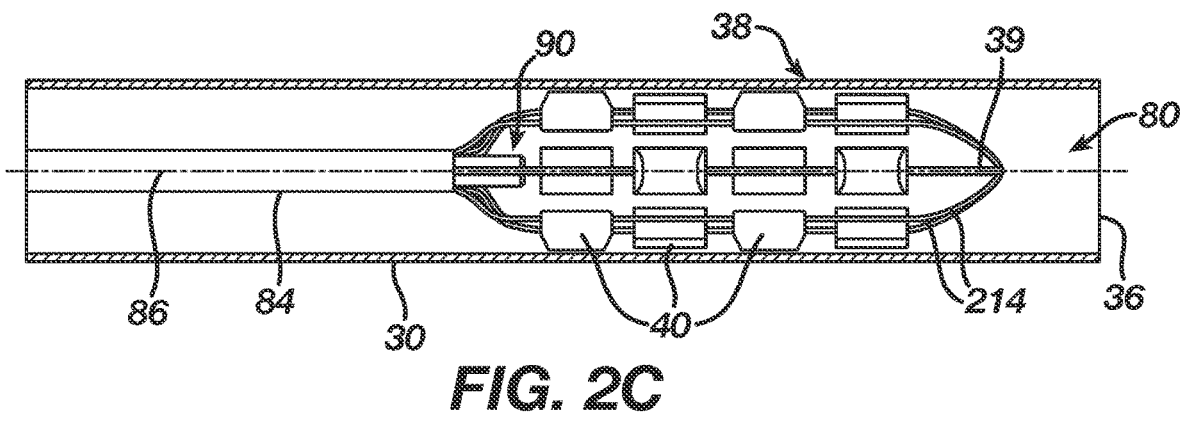
FIG. 2C is a schematic pictorial illustration showing a side view of a medical probe in a collapsed form, in accordance with embodiments of the present invention.

The system 20 may supply irrigation fluid (e.g., a saline solution) to distal end 36 and to the electrodes 40 via a channel (not shown) in tubular shaft 84 (see FIGS. 2A through 2C). Irrigation may be utilized in some instances to reduce blood clot formations or blood pooling near the ablation electrodes or even to transfer any heat generated in the electrodes during ablation. Additionally, or alternatively, irrigation fluid can be supplied through the flexible insertion tube 30. Control console 24 includes an irrigation module 60 to monitor and control irrigation parameters, such as the pressure and the temperature of the irrigation fluid. It is noted that while the preference for the exemplary embodiments of the medical probe is for IRE or PFA, it is within the scope of the present invention to also use the medical probe separately only for RF ablation (unipolar mode with an external grounding electrode or bipolar mode) or in combination with IRE and RF ablations sequentially (certain electrodes in IRE mode and other electrodes in RF mode) or simultaneously (groups of electrodes in IRE mode and other electrodes in RF mode).

Based on signals received from electrodes 40 and/or adhesive skin patches 44, processor 46 can generate an electroanatomical map 62 that shows the location of distal end 36 in the patient's body. During the procedure, processor 46 can present map 62 to medical professional 34 on a display 64, and store data representing the electroanatomical map in a memory 66. Memory 66 may include any suitable volatile and/or non-volatile memory, such as random-access memory or a hard disk drive.

In some embodiments, medical professional 34 can manipulate map 62 using one or more input devices 68. In alternative embodiments, display 64 may include a touchscreen that can be configured to accept inputs from medical professional 34, in addition to presenting map 62.

FIGS. 2A and 2B are schematic pictorial illustrations showing a perspective view of a medical probe 22 including a basket assembly 38 in an expanded form when unconstrained, such as by being advanced out of an insertion tube lumen 80 at a distal end 36 of an insertion tube 30. The medical probes 22 illustrated in FIGS. 2A and 2B lack the guide sheath illustrated in FIG. 1. FIG. 2C shows the basket assembly a collapsed form within insertion tube 30 of the guide sheath. In the expanded form (FIGS. 2A and 2B), spines 214 bow radially outwardly and in the collapsed form (FIG. 2C) the spines are arranged generally along a longitudinal axis 86 of insertion tube 30.

As shown in FIG. 2A, basket assembly 38 includes a first unitary tripodic structure 213A including three spines 214 formed from a planar sheet of reliant and flexible material that allows for bending of the spines to form basket assembly 38 at the end of a tubular shaft 84. During a medical procedure, medical professional 34 can deploy basket assembly 38 by extending tubular shaft 84 from insertion tube 30 causing basket assembly 38 to exit insertion tube 30 and transition to the expanded form. Spines 214 may have elliptical (e.g., circular) or rectangular (that may appear to be flat) cross-sections, and include a flexible, resilient material (e.g., a shape-memory alloy such as nickel-titanium, also known as Nitinol) forming a strut as will be described in greater detail herein.

As shown in FIG. 2A, the first unitary tripodic structure 213A includes three linear spines 214 that converge at a first central spine intersection 211A. In some examples the first central spine intersection 211A can include one or more cutouts 212 that alter the flexibility of the tripodic structure 213 and allow for more bending of the spines 214. It is noted that the cutouts (in various configurations described and illustrated in the specification allows for a much smaller form factor when undeployed (or undergoing a retraction into a delivery sheath) without buckling or plastic deformation.

As shown in FIG. 2B, basket assembly 38 can include first unitary tripodic structure 213A and a second unitary tripodic structure 213B, similarly including three linear spines 214 converging at the central spine intersection (the second central spine intersection 211B). Second central spine intersection 211B can include one or more cutouts 212 similar to first central spine intersection 211A, as depicted in FIG. 2B, but in some examples, the first or second central spine intersections 211A, 211B can be solid (no cutouts) or present cutouts on only one tripodic structure 213A, 213B.

In embodiments described herein, one or more electrodes 40 positioned on spines 214 of basket assembly 38 can be configured to deliver ablation energy (RF and/or IRE) to tissue in heart 26. Additionally, or alternatively, the electrodes can also be used to determine the location of basket assembly 38 and/or to measure a physiological property such as local surface electrical potentials at respective locations on tissue in heart 26. The electrodes 40 can be biased such that a greater portion of the one or more electrodes 40 face outwardly from basket assembly 38 such that the one or more electrodes 40 deliver a greater amount of electrical energy outwardly away from the basket assembly 38 (i.e., toward the heart 26 tissue) than inwardly.

Examples of materials ideally suited for forming electrodes 40 include gold, platinum and palladium (and their respective alloys). These materials also have high thermal conductivity which allows the minimal heat generated on the tissue (i.e., by the ablation energy delivered to the tissue) to be conducted through the electrodes to the back side of the electrodes (i.e., the portions of the electrodes on the inner sides of the spines), and then to the blood pool in heart 26.

Figure 4:
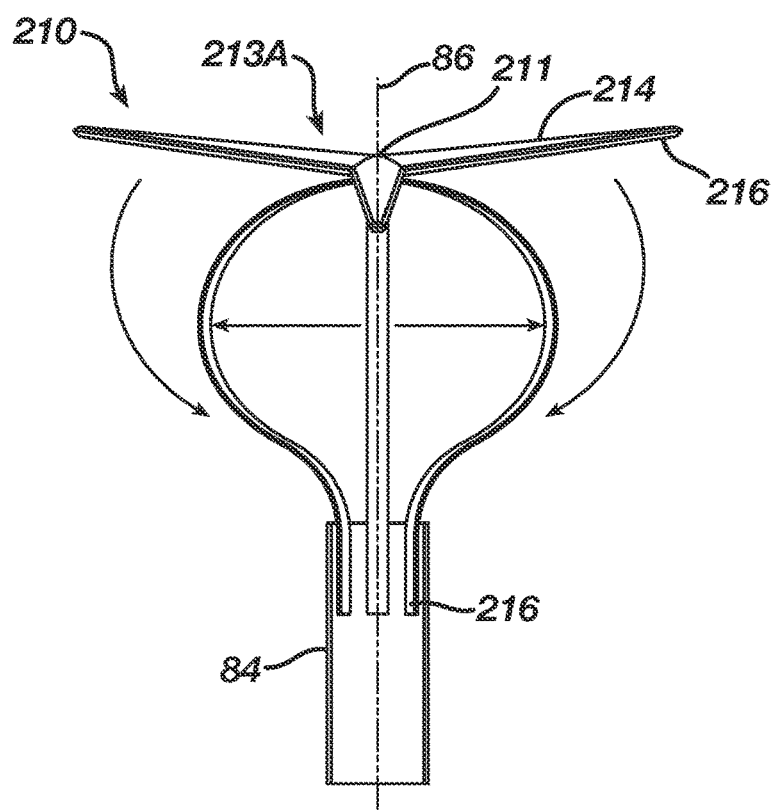
FIG. 4 is a schematic pictorial illustration showing a side view of a tripodic structure including three spines forming a basket assembly, in accordance with an embodiment of the present invention.
Figure 5A:
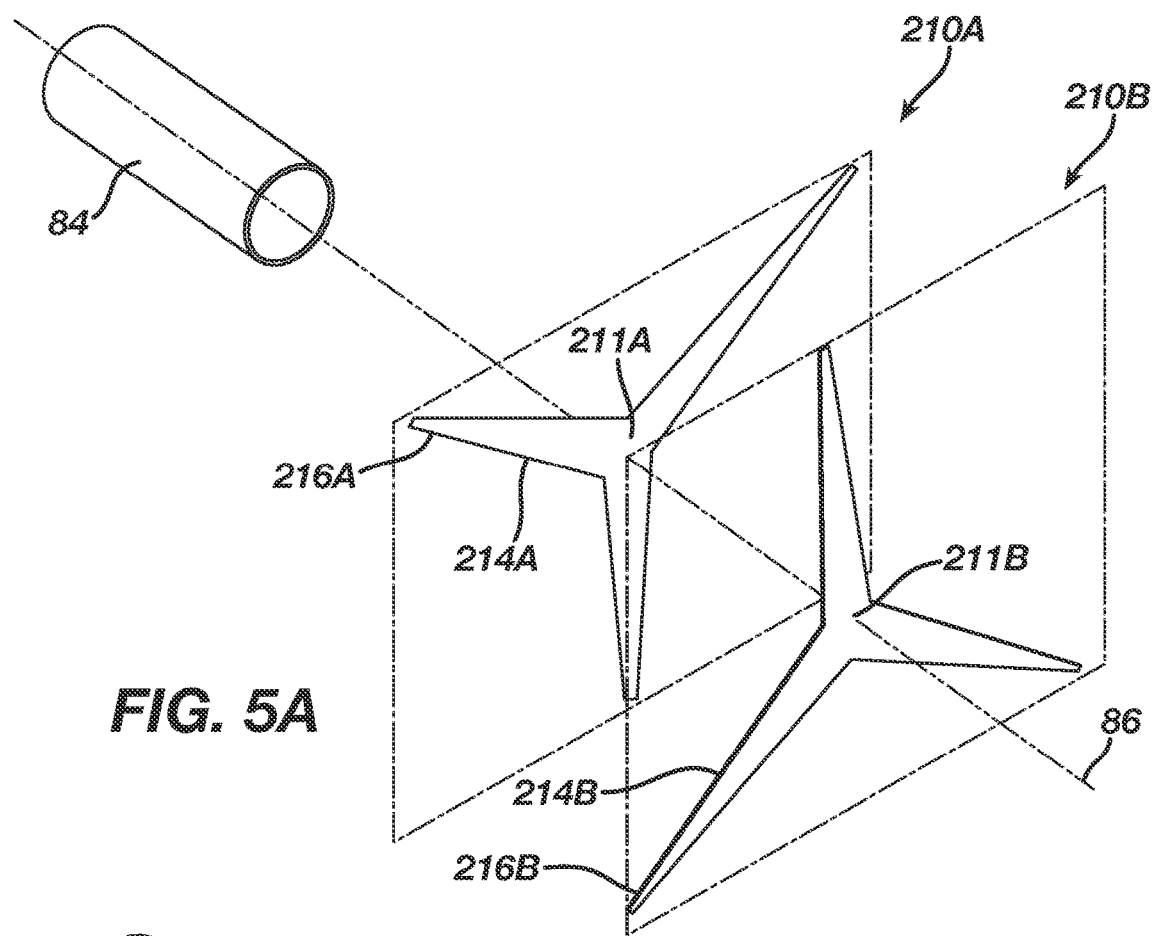
FIGS. 5A and 5B are schematic pictorial illustrations of a method of forming a basket assembly, in accordance with an embodiment of the present invention.

Turning to FIG. 2D, basket assembly 38 includes a first unitary tripodic structure 213A including three linear spines 214 formed from a planar sheet of material 210, 210A (shown more clearly in FIGS. 4 and 5A). FIG. 2E shows basket assembly 38 including a second unitary tripodic structure 213B overlapping first tripodic structure 213A. Although now shown, basket assembly 38 can include more than two unitary tripodic structures.

In any embodiment disclosed herein, the spines on each tripodic structures 213A, 213B can have respective spine attachment ends 216 that are configured to couple to the distal end of the tubular shaft 84 and/or a spine retention hub 90 disposed within tubular shaft 84. The medical probe 22 can include a spine retention hub 90 disposed proximate the distal end 85 of the tubular shaft 84. The spine retention hub 90 can be inserted into the tubular shaft 84 and attached to the tubular shaft 84. Spine retention hub 90 can include a cylindrical member 94 including a plurality of relief lands 96, multiple irrigation openings 98, and at least one spine retention hub electrode 99. Relief lands 96 can be disposed on the outer surface of cylindrical member 94 and configured to allow at least a portion of each spine 214, such as each spine attachment end 216, to be fitted into a respective relief land 96. The attachment end 216 can be a generally linear end of the spine 214. The attachment end 216 can be configured to extend distally from the spine retention hub 90 such that the basket assembly 38 is positioned distally from the spine retention hub 90 and, consequently, distally from the tubular shaft 84. In this way, the spine 214 can be configured to position the basket assembly 38 distally from the distal end of the tubular shaft 84 and distal from the distal end of the insertion tube 30 when the basket assembly is deployed.

As described supra, control console 24 includes irrigation module 60 that delivers irrigation fluid to distal end 36. The multiple irrigation openings 98 can be angled to spray or otherwise disperse of the irrigation fluid to either a given electrode 40 or to tissue in heart 26. Since electrodes 40 do not include irrigation openings that deliver irrigation fluid, the configuration described hereinabove enables heat to be transferred from the tissue (i.e., during an ablation procedure) to the portion of the electrodes on the inner side of the spines 214, and the electrodes 40 can be cooled by aiming the irrigation fluid, via irrigation openings 98, at the portion of the electrodes 40 on the inner side of the spines 214. Spine retention hub electrode 99 disposed at a distal end of retention hub 90 can be used in combination with electrodes 40 on the spines 214, or alternatively, can be used independently from electrodes 40 for reference mapping or ablation.

Figure 3A:
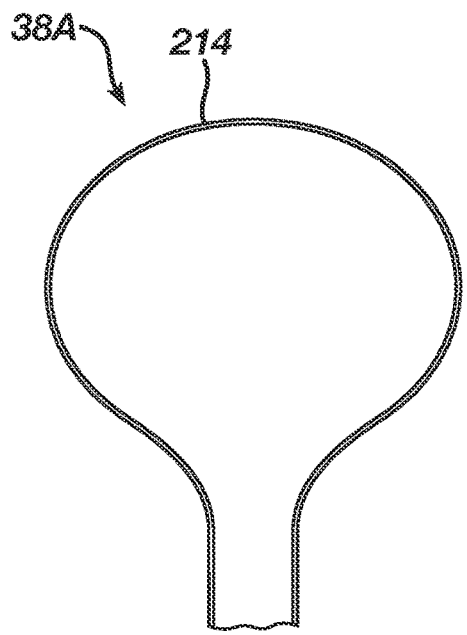
FIGS. 3A and 3B are schematic pictorial illustrations showing a profile view of a basket assembly of a given medical device, in accordance with embodiments of the present invention.
Figure 3B:
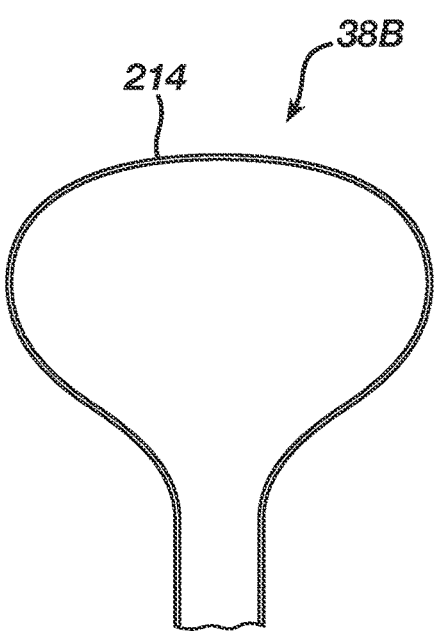

FIGS. 3A and 3B are schematic pictorial illustrations showing a profile outline of spines 214 of a basket assembly 38A, 38B of a given medical device 22, in accordance with embodiments of the present invention. To illustrate, the basket assembly can have a profile as shown in FIG. 3A that is approximately circular to form an approximately spherical shape when basket assembly 38A is in the expanded form. As another example, the basket assembly can have a profile as shown in FIG. 3B that is an approximately elliptical shape to form an approximately oblate-spheroid shape when basket assembly 38B is in the expanded form. Although not every variation of shape is shown or described herein, one skilled in the art will appreciate that spines 214 can be further configured to form other various shapes as would be suitable for the particular application.

By including spines 214 configured to form various shapes when in the expanded form, basket assembly 38 can be configured to position the various electrodes 40 attached to spines 214 at various locations, with each location being nearer or farther from the distal end of tubular shaft 84. For example, electrode 40 attached to spine 214 illustrated in FIG. 3A near the middle of spine 214 would be farther from the distal end of tubular shaft 84 than spine 214 illustrated in FIG. 3B when basket assembly 38 is in the expanded form. In addition, each spines 214 may have an elliptical (e.g., circular) or rectangular (that may appear to be flat) cross-section, and include a flexible, resilient material (e.g., a shape-memory alloy such as nickel-titanium (also known as Nitinol), cobalt chromium, or any other suitable material).

Figure 5B:
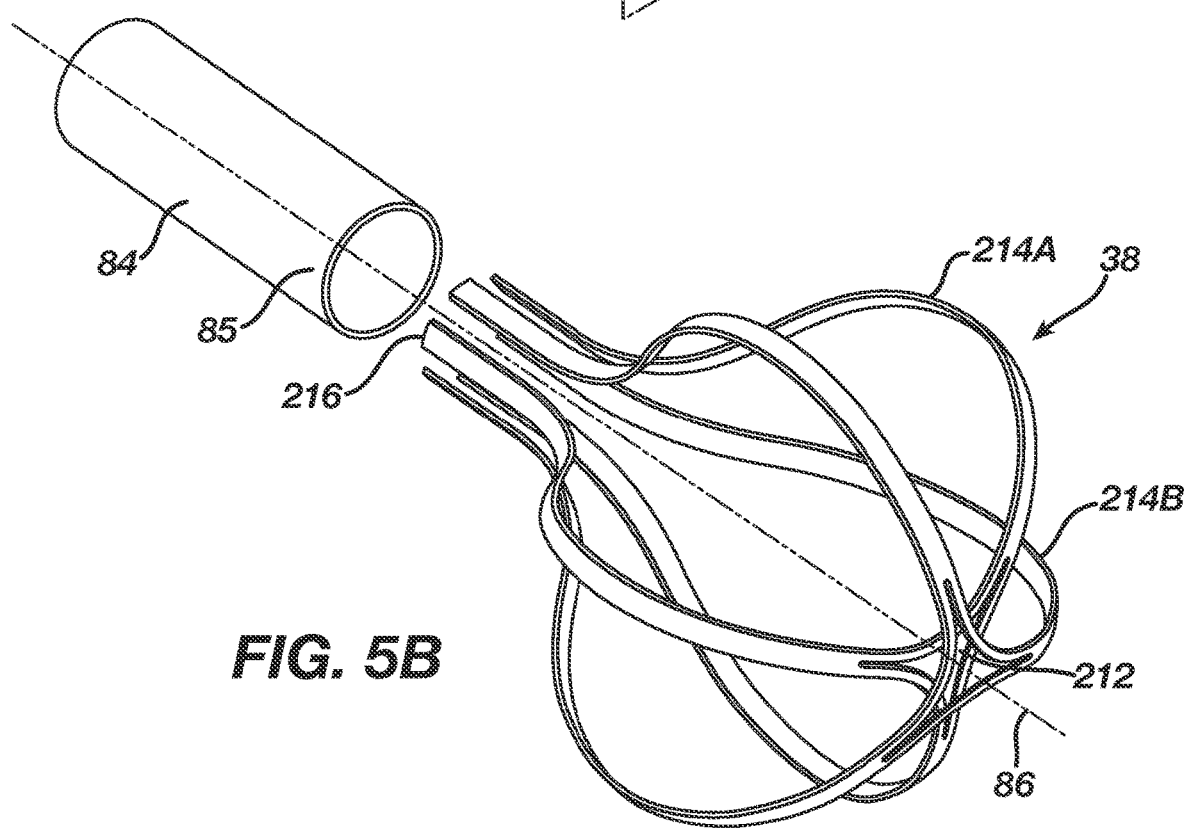

FIGS. 4, 5A and 5B are schematic pictorial illustrations showing views of first structure 213A forming basket assembly 38 (FIG. 4) and both first and second structures 213A, 213B forming basket assembly 38 (FIGS. 5A and 5B). In particular, FIG. 4 provides one example of how planar sheet of material 210 may be assembled together with tubular shaft 84 whereby each spine 214 bends or curves when respective attachment ends 216 are connect to spine retention hub 90. As shown in FIG. 5A, first structure 213A can be overlapped with second structure 213B, both formed from a single sheet of planar material 210A, 210B, to form a generally three-star structure when laid flat. In other words, spines 214 of each first and second structure 213A, 213B can be formed from the single planar sheet of material such that the spines 214 converge toward a respective central intersection 211A, 211B. Central intersection 211A, 211B can be a solid piece of material (as shown in FIG. 5A) or include a cutout 212 (as shown in FIG. 5B). Basket assembly 38 can include a number of structures including three spines. As would be appreciated by those of skill in the relevant art, overlapping additional structures including three formed from planar sheets of material can alter flexibility of basket assembly 38 and increase the number of electrodes 40.

Figure 6A:
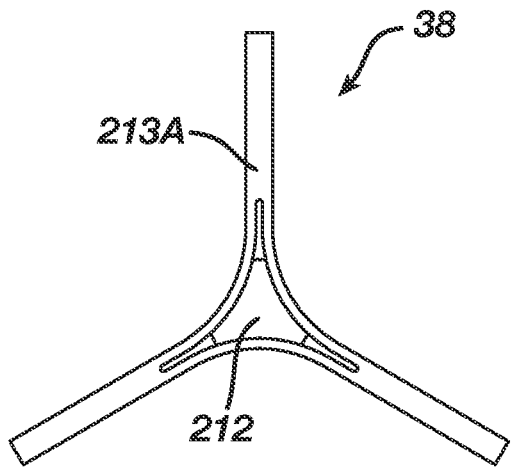
FIGS. 6A through 6D are schematic pictorial illustrations of top-down views of a basket assembly, showing various examples of a central intersection, in accordance with an embodiment of the present invention.
Figure 6B:
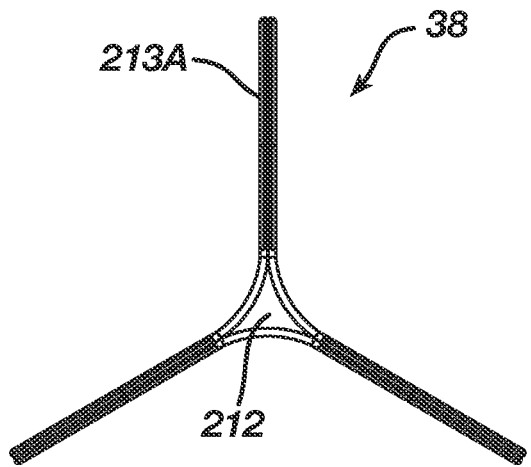
Figure 6C:
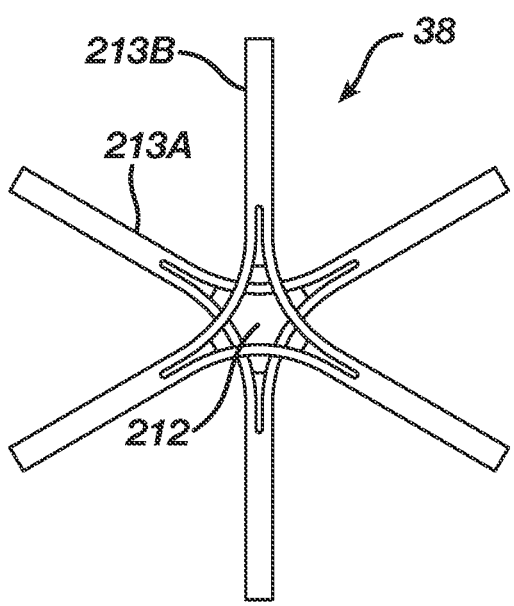
Figure 6D:
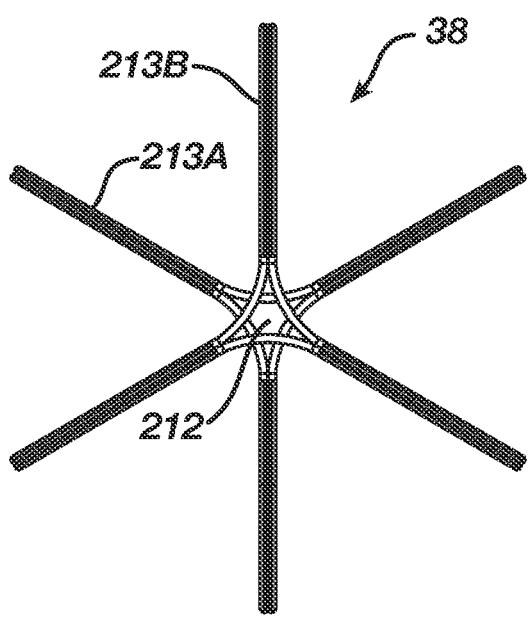

FIGS. 6A through 6D are schematic pictorial illustrations of top-down views of basket assembly 38, showing various examples of central intersection 211 one or more cutouts 212. As shown, intersection 211 can include a single discrete cutout 212. Although not shown, intersection 211 can also include two or more cutouts. The one or more cutouts 212 can include a variety of patterns, such as centrosymmetric (i.e., symmetric with respect to a central point), and equiangular (i.e., including equal angles) to allow for equal bending among the spines 214 as well as disproportional and asymmetric to allow for unequal bending of spines 214 to alter structural stability. In certain instances, when basket assembly 38 includes more than first structure 213A, basket assembly 38 will include more than one cutout 212, as shown in FIGS. 6C and 6D. In any of the embodiments described herein, cutout 212 can extend along a portion of each spine 214.

The spines 214 can be folded or otherwise bent such that each respective attachment end 216 of the spine 214 can be inserted into the distal end 85 of the tubular shaft 84 and relief lands 96 of spine retention hub 90. Although not shown in FIGS. 5A and 5B, it will be appreciated that electrodes 40 can be attached to spines 214 before the spines are inserted into the tubular shaft 84 to form the basket assembly 38. As stated previously, the spines 214 can include a flexible, resilient material (e.g., a shape-memory alloy such as nickel-titanium, also known as Nitinol) that can enable the basket assembly 38 to transition to its expanded form (as shown in FIGS. 2A and 2B) when the basket assembly 38 is deployed from tubular shaft 84. As will become apparent throughout this disclosure, spines 214 can be electrically isolated from electrode 40 to prevent arcing from electrode 40 to the respective spine 214.

As will be appreciated by one skilled in the art with the benefit of this disclosure, basket assembly 38 shown in FIGS. 2A through 2E including spines 214 formed from a planar sheet of material and converging at a central intersection is offered merely for illustrative purposes and the disclosed technology can be applicable to other configurations of basket assemblies 38. For example, the disclosed technology can be applicable to basket assemblies 38 formed from a single spine 214 or multiple spines 214 with each spine 214 being attached at both ends. In other examples, the basket assembly 38 can include a retention hub connecting the multiple spines 214 together at a distal end 39 of the basket assembly 38. In yet other examples, the basket assembly 38 can include a single spine 214 configured to form a spiral, multiple spines 214 configured to form a spiral, multiple spines 214 configured to form a tripod or multiple tripods, or any other shape of basket assembly 38. Thus, although FIGS. 2A through 2C illustrate a specific configuration of basket assembly 38, the disclosed technology should not be construed as so limited.

Referring back to FIGS. 2A through 2E, one or more electrodes 40 can be attached to spines 214 to form the basket assembly 38. In some examples, each electrode 40 can include electrically conductive material (e.g., gold, platinum and palladium (and their respective alloys)). Turning to FIGS. 7A through 7J, electrode 40 can have a variety of cross-sectional shapes, curvatures, lengths, lumen number and lumen shape as provided as examples in electrodes 740A-740E. The electrodes 740A-740E are offered to illustrate various configurations of electrodes 40 that can be used with the medical device 22 but should not be construed as limiting. One skilled in the art will appreciate that various other configurations of electrodes 40 can be used with the disclosed technology without departing from the scope of this disclosure.

Each electrode 740A-740E can have an outer surface 774 facing outwardly from electrode 740 and an inner surface 776 facing inwardly toward electrode 740 where at least one lumen 770 is formed through electrode 740. The lumen 770 can be sized and configured to receive a spine 214 such that spine 214 can pass through electrode 740. Lumen 770 can be a symmetric opening through electrode 740A-740E and can be disposed offset with respect to a longitudinal axis L-L of the respective electrode. In other examples, lumen 770 can pass through electrode 740 in a generally transverse direction with respect to the longitudinal axis L-L of the respective electrode. Furthermore, lumen 770 can be positioned in electrode 740 nearer a bottom surface, nearer a top surface, or nearer a middle of electrode 740 depending on the particular configuration. In FIGS. 7A, 7C, and 7E through 7J, the top surface (upper side) is oriented toward the top of the drawing, the bottom surface (lower side) is oriented toward the bottom of the drawing, and the middle is between the top surface and the bottom surface. In other words, each electrode 740A-740E can include a lumen 770 that is offset with respect to a centroid of the electrode 740A-740E.

In addition, as shown in FIGS. 7A through 7F, electrodes 740A-740E can have a wire relief 772 forming a recess or depression in electrode 740 adjacent lumen 770 for one or more wires to pass through lumen 770 along with a respective spine 214. Relief 772 can be sized to provide room for a wire of electrode 740 to pass through electrode 740 such that electrode 740 can be in electrical communication with the control console 24.

Alternatively, or in addition thereto, wires can pass through a wire lumen 773 as shown in example electrodes 740D and 740E in FIGS. 7G through 7J. Although not depicted, electrodes 40 may include both a wire relief 772 adjacent lumen 770 and wire lumen 773. Such electrode may permit additional wires to pass through the electrode body.

Figure 7A:
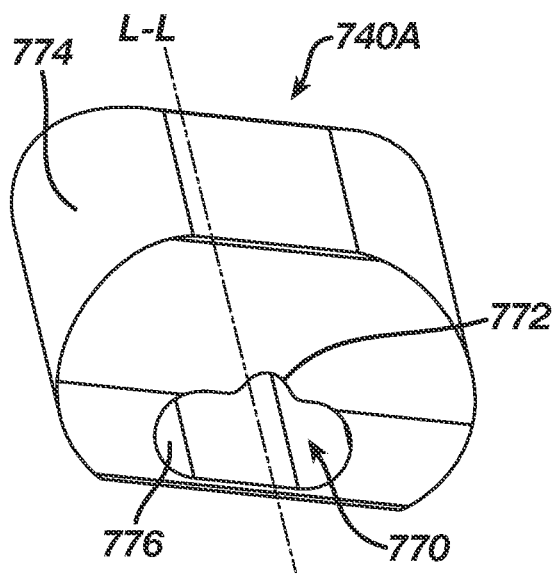
FIGS. 7A through 7J are schematic pictorial illustrations showing a perspective view of various example electrodes, in accordance with embodiments of the present invention.
Figure 7B:
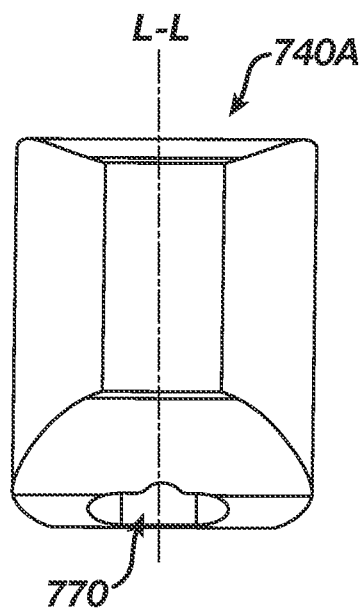
Figure 7C:
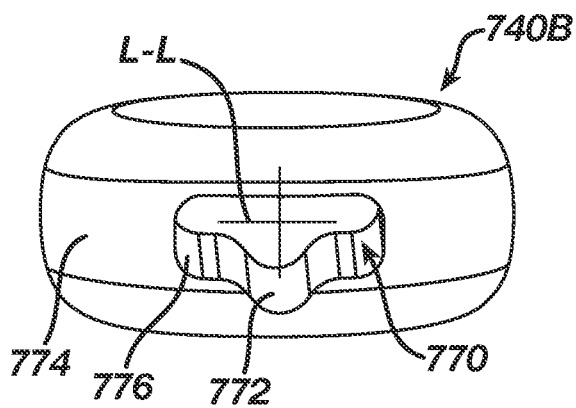
Figure 7D:
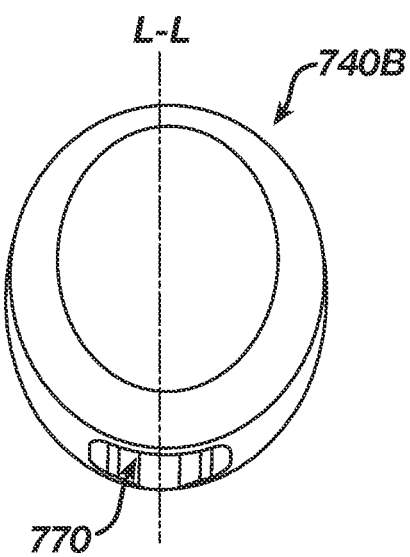
Figure 7E:
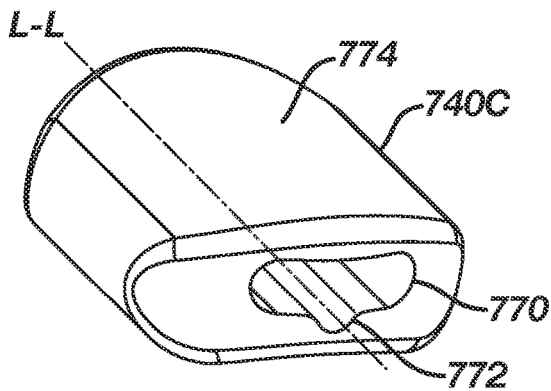
Figure 7F:
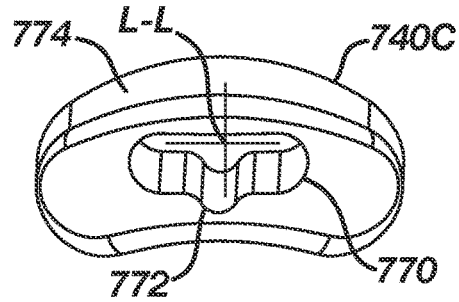
Figure 7G:
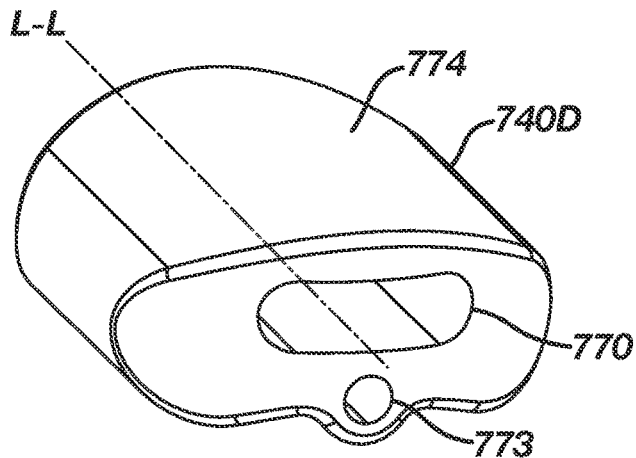
Figure 7H:
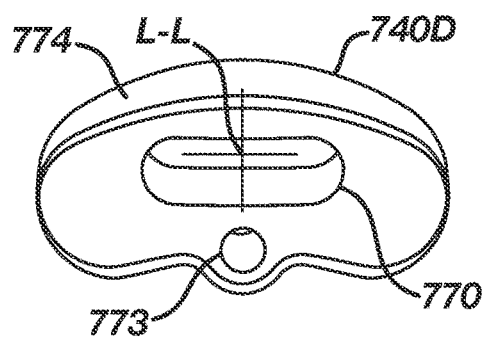
Figure 7I:
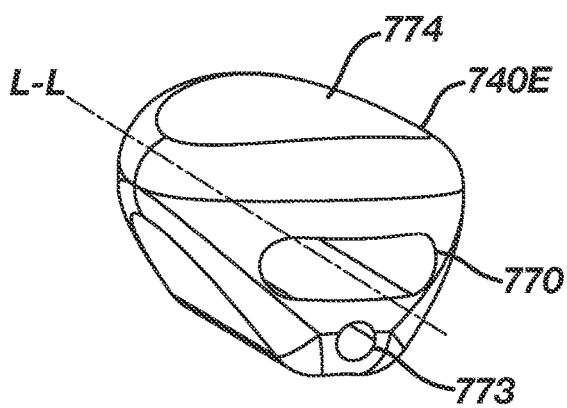
Figure 7J:
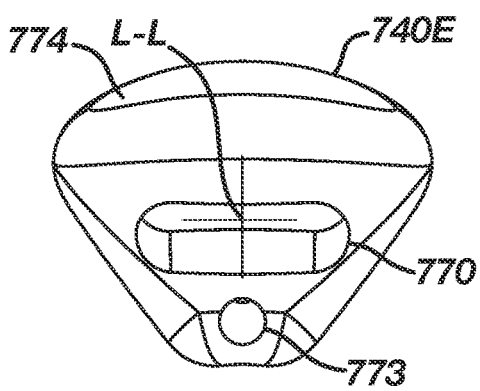

As shown in FIGS. 7A-7J, the electrodes 740A-740C can include various shapes depending on the application. For example, as illustrated in FIGS. 7A and 7B, the electrode 740A can have a substantially rectangular cuboid shape with rounded edges. In other examples, the electrode 740B can have a substantially ovoid shape (as illustrated in FIGS. 7C and 7D), the electrode 740C, 740D can have a contoured shape including a convex side and a concave side (as illustrated in FIGS. 7E through 7H), or the electrode 740E can have a contoured shape including substantially more material proximate an upper side than a lower side of the electrode 740E (as illustrated in FIGS. 7I and 7J). As will be appreciated by one of skill in the art, the various example electrodes 740A-740E shown in FIGS. 7A-7J, and described herein, are offered for illustrative purposes and should not be construed as limiting.

Figure 8A:
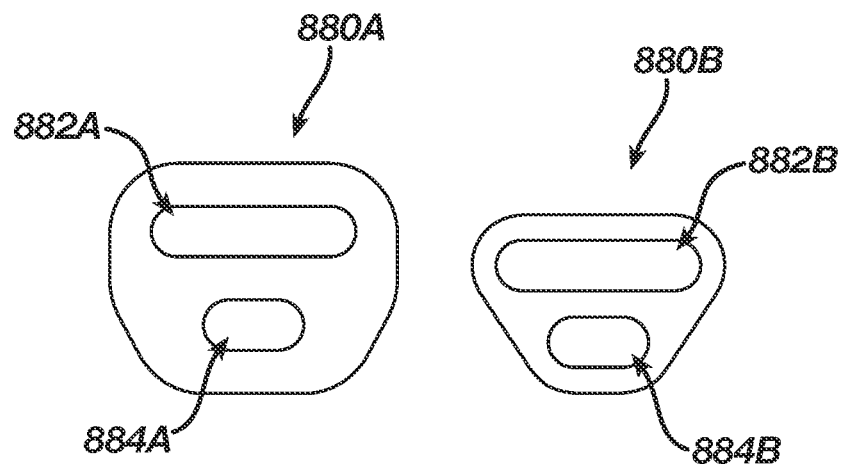
FIGS. 8A and 8B are schematic pictorial illustrations showing various insulative jackets of a given medical device, in accordance with embodiments of the present invention.
Figure 8B:
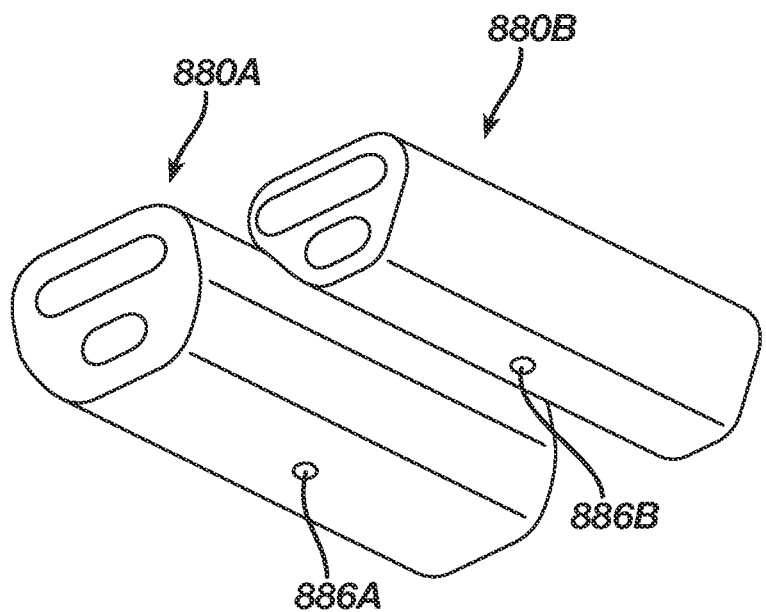

FIGS. 8A and 8B are schematic pictorial illustrations showing various insulative jackets 880A, 880B of a given medical device 22, in accordance with embodiments of the present invention. FIG. 8A is a front view while FIG. 8B is a perspective view of insulative jackets 880A. 880B. Insulative jackets 880A, 880B can be made from a biocompatible, electrically insulative material such as polyamide-polyether (Pebax) copolymers, polyethylene terephthalate (PET), urethanes, polyimide, parylene, silicone. In some examples, insulative material can include biocompatible polymers including, without limitation, polyetheretherketone (PEEK), polyglycolic acid (PGA), poly (lactic-co-glycolic acid) copolymer (PLGA), polycaprolactive (PCL), poly (3-hydroxybutyrate-co-3-hydroxyvalerate) (PHBV), poly-L-lactide, polydioxanone, polycarbonates, and polyanhydrides with the ratio of certain polymers being selected to control the degree of inflammatory response. Insulative jackets 880A, 880B may also include one or more additives or fillers, such as, for example, polytetrafluoroethylene (PTFE), boron nitride, silicon nitride, silicon carbide, aluminum oxide, aluminum nitride, zinc oxide, and the like. Insulative jacket 880A, 880B can help to insulate a spine 214 and/or wires passing through insulative jacket 880A, 880B from electrode 40 to prevent arcing from electrode 40 to the spine 214 and/or mechanical abrasion of wires passing through insulative jacket 880A, 880B.

As illustrated in FIGS. 8A and 8B, insulative jackets 880A, 880B, can include a cross-sectional shape that is substantially trapezoidal. The insulative jacket may consist of a single lumen or multi-lumen configuration. Multi-lumen jackets may be configured such that the alloy frame and wires share a single lumen while the second lumen may be used for irrigation. The alloy frame and wires may occupy separate lumens, also, as described. The current embodiment does not utilize irrigated jackets. For these designs, the insulative jackets may be continuous (individual sleeves extending from proximal to distal end of each alloy frame strut), segmented (bridging between electrode gaps), or a combination of both. Furthermore, insulative jacket 880A, 880B can include a first lumen 882A, 882B and a second lumen 884A, 884B. First lumen 882A, 882B can be configured to receive spine 214 while second lumen 884A, 884B can be configured to receive a wire, or vice-versa. In other examples, first lumen 882A, 882B and second lumen 884A, 884B can each be configured to receive one or more wires that can be connected to one or more electrodes 40. Furthermore, as illustrated in FIG. 8B, insulative jacket 880A, 880B can include an aperture 886A, 886B through which a wire can be electrically connected to electrode 40. Although illustrated in FIG. 8B as being proximate a bottom of insulative jacket 880A, 880B, aperture 886A, 886B can be positioned proximate a top or side of insulative jacket 880A, 880B. Furthermore, insulative jacket 880A, 880B can include multiple apertures 886A, 886B with each aperture being disposed on the same side of insulative jacket (i.e., top, bottom, left, right) or on different sides of the insulative jacket depending on the application.

Figure 9A:
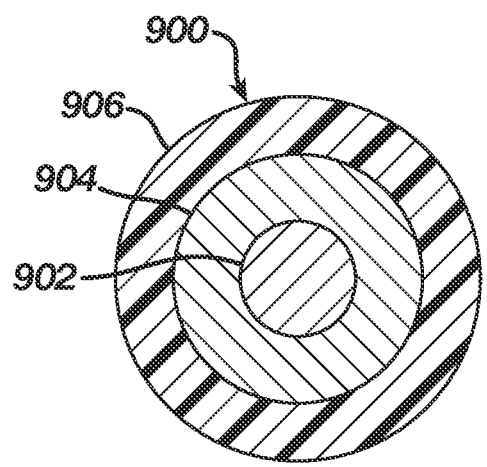
FIGS. 9A and 9B are schematic pictorial illustrations showing cross-sectional views of a given wire of a medical probe, in accordance with an embodiment of the present invention.
Figure 9B:
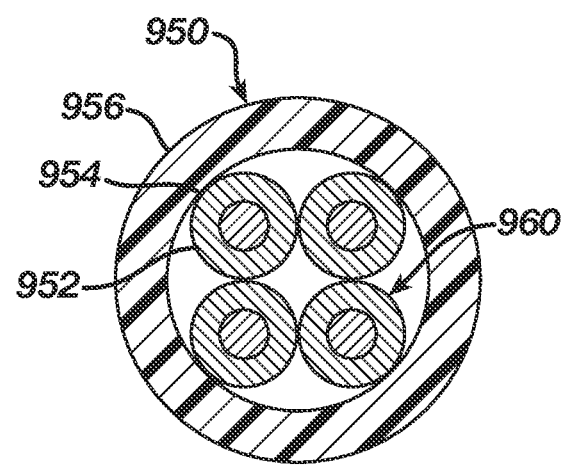

FIGS. 9A and 9B are schematic pictorial illustrations showing cross-sectional views of a given wire 900, 950 that can be connected to a given electrode 40, in accordance with an embodiment of the present invention. FIG. 9A illustrates a solid core wire 900. FIG. 9B illustrates a stranded wire 950. Each wire 900, 950 can extend through at least a portion of tubular shaft 84 and tubular shaft 84. Solid core wire 900 can include an electrically conductive core material 902 and an electrically conductive cover material 904 circumscribing electrically conductive core material 902. Likewise, stranded wire 950 can include strands each including an electrically conductive core material 952 and an electrically conductive cover material 954 circumscribing the electrically conductive core material 952. Each wire 900, 950 can include an insulative jacket 906 circumscribing the conductors. The wires 900, 950 can be configured to withstand a voltage difference of adjacent wires sufficient to deliver IRE pulses. Preferably, the wires 900, 950 can withstand at least 900V, and more preferably at least 1,800V between adjacent wires. To reduce likelihood of dielectric breakdown between conductors of adjacent wires, electrically conductive cover material 904, 954 can have a lower electrical conductivity compared to core material 902, 952.

Insulative jacket 906 can be configured to have a temperature rating between 150 and 200 degrees Centigrade so that the electrically insulative jacket 906 melts or degrades (e.g., chars and crumbles) during soldering of wire 900 to electrodes 40 (e.g., at a temperature of 300 degrees Centigrade) and therefore insulative jacket 906 of wire 900 does not need to be mechanically stripped. In other examples, insulative jacket 906 can have a temperature rating greater than 200 degrees Centigrade to prevent electrically insulating material 902 melting or degrading (e.g., charring and crumbling) during manufacture of medical probe 22 and/or during use. Insulative jacket 906 can be mechanically stripped from wire 900 prior to wires 900 being electrically connected to electrodes 40.

Figure 10A:
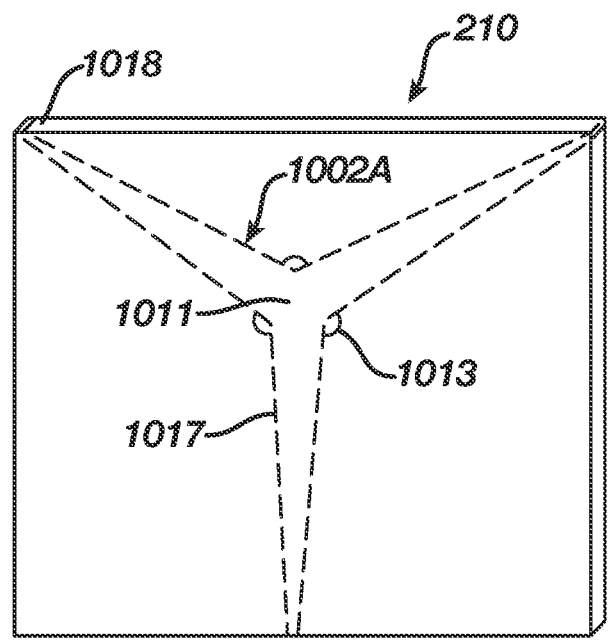
FIGS. 10A and 10B are schematic pictorial illustrations of cutting tripodic structure patterns including three spines from a planar sheet of material, in accordance with an embodiment of the present invention.
Figure 10B:
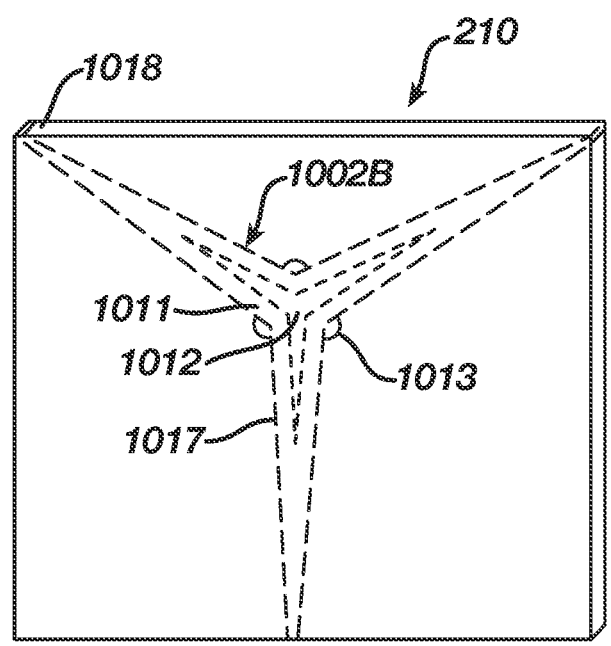

FIGS. 10A and 10B are schematic pictorial illustrations of cutting tripodic structure patterns 1002 from a planar sheet of material 210 including three linear spines. As described supra, planar sheet of material 210 can include three spines 214. As illustrated in FIG. 10A, planar sheet of material 210 can include central intersection 1011 and a spine pattern 1002A, which include one or both of longitudinal scores 1017 and transverse scores 1018. In any of the embodiments disclosed herein, planar sheet of material 210 can also include an equiangular pattern 1013 between spines. FIG. 10B provides an example spine patterns 1002B including one or more cutout patterns 1002B to form one or more cutouts 1012 on central intersection 1011.

Figure 11:
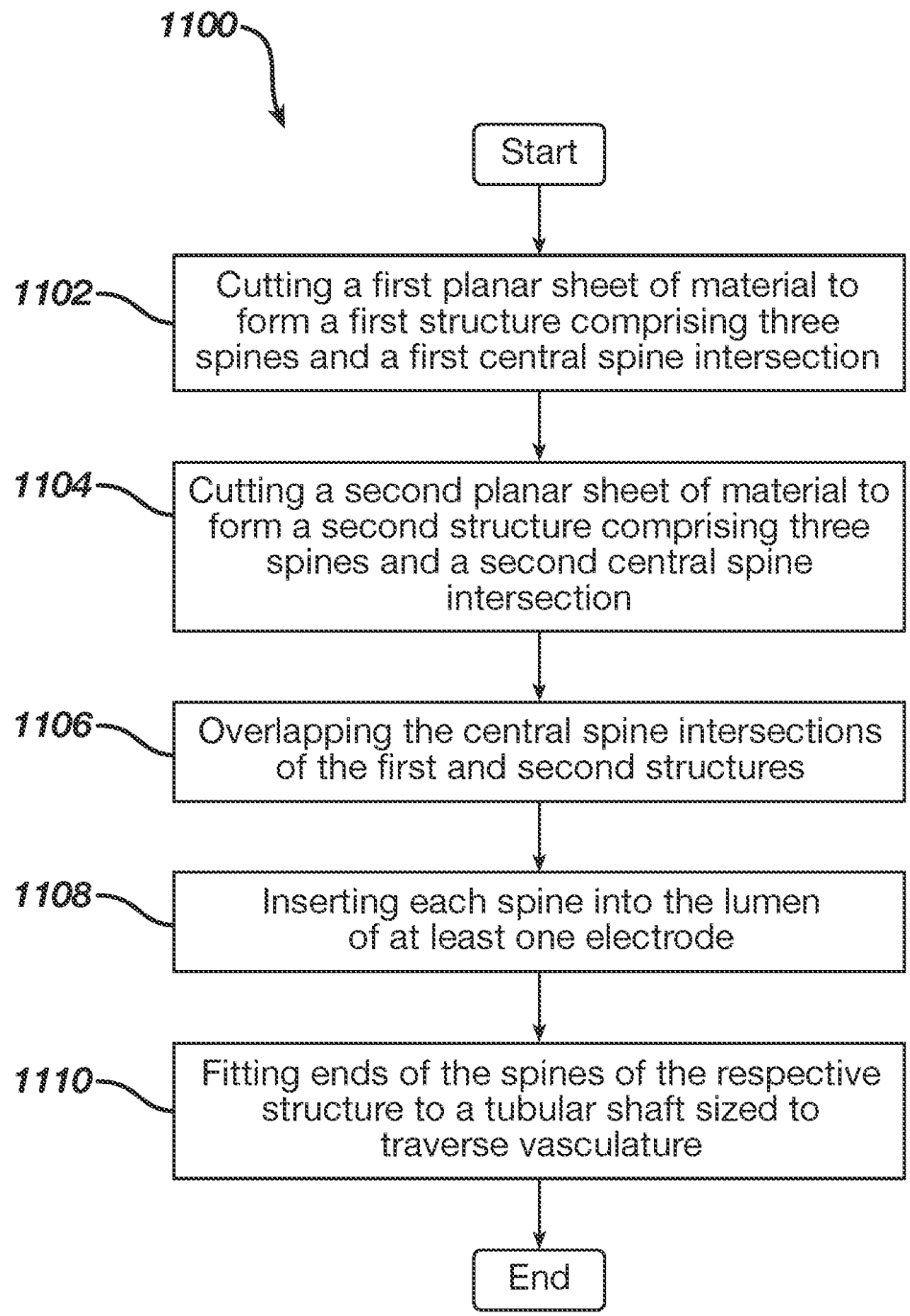
FIG. 11 is a flowchart illustrating another method of assembling a basket assembly, in accordance with an embodiment of the present invention.

FIG. 11 is a flowchart illustrating a method 1100 of manufacturing a basket assembly 38, in accordance with an embodiment of the present invention. Method 1100 can include cutting 1102 a first sheet of planar material 210A to form a first structure 213A including three spines 214 including a first central spine intersection 211A. Method 1100 can include cutting 1104 a second sheet of planar material 210B to form a second structure 213B including three spines 214 including a second central spine intersection 211B. Cutting 1102, 1104 the first and second structures 213A, 213B can include cutting from a pattern 1002A, 1002B including longitudinal and transverse scores 1017, 1018 from the planar sheet of material 210. The planar sheet of material can include resilient, shape-memory alloy such as nickel-titanium (also known as Nitinol), cobalt chromium, or any other suitable material. Method 1100 can include overlapping 1106 the central spine intersections 211A. 211B of the first and second structures 213A, 213B. Method 1100 can include inserting 1108 each spine into a lumen 70 of at least one electrode 40. The electrodes can be positioned such that the electrodes are offset between electrodes on adjacent spines. Method 1100 can include fitting 1110 ends of the spines 214 of the respective structure 213A, 213B to a tubular shaft 84 sized to traverse vasculature such that the central spine intersections are positioned at a distal end 39 of the medical probe 22 and respective spines 214 are movable from a tubular configuration to a bowed configuration. As will be appreciated by one of skill in the art including the benefit of this disclosure, fitting 1106 an end of the spine into a tubular shaft can include attaching the spine 214 to a spine retention hub 90. Furthermore, the spine retention hub 90 and/or the spine 214 and the tubular shaft 84 can be inserted into a flexible insertion tube 30 to form the medical probe 22. Method 1100 can end at step 1110 or can also further include cutting a discrete cutout 214 at one or both of the central spine intersections 211A, 211B. As described supra. the discrete cutout 214 can be a single cutout or two or more cutouts. In addition, the one or more discrete cutouts can be cut in a pattern to extend along at least a portion of each spine. Method 1100 can end after fitting 1110 ends of the spines into the tubular shaft 84 or can further include electrically connecting the wire to the one or more electrodes. Method 1100 can also include disposing an insulative sleeve over the spines and within the lumen of the respective electrode.

As will be appreciated by one skilled in the art, method 1100 can include any of the various features of the disclosed technology described herein and can be varied depending on the particular configuration. Thus, method 1100 should not be construed as limited to the particular steps and order of steps explicitly described herein.

The disclosed technology described herein can be further understood according to the following clauses:

Clause 1: A medical probe, comprising: a tubular shaft including a proximal end and a distal end, the tubular shaft extending along a longitudinal axis; an expandable basket assembly proximate the distal end of the tubular shaft, the basket assembly comprising a first unitary tripodic structure and a second unitary tripodic structure, each tripodic structure formed from a respective planar sheet of material that includes three linear spines converging at a respective central spine intersection, each spine of each tripodic structure including a respective end connected to the distal end of the tubular shaft, the central spine intersection of each tripodic structure being positioned on the longitudinal axis at a distal end of the basket assembly; and one or more electrodes coupled to each of the spines, each electrode defining a lumen through the electrode so that the spine extends through the lumen of each of the one or more electrodes.

Clause 2: The medical probe according to Clause 1, wherein the three linear spines extend from the central spine intersection in an equiangular pattern such that respective angles between respectively adjacent spines are approximately equal.

Clause 3: The medical probe according to Clause 1 or 2, wherein the first and second unitary tripodic structures are rotated along the longitudinal axis such that the spines of the respective tripodic structure are non-overlapping.

Clause 4: The medical probe according to Clause 1, wherein the expandable basket assembly is approximately spherical.

Clause 5: The medical probe according to Clause 1, wherein the expandable basket assembly is approximately oblate-spheroid.

Clause 6: The medical probe according to any one of Clauses 1-5, further comprising a spine retention hub disposed proximate the distal end of the tubular shaft, the spine retention hub comprising a cylindrical member including a plurality of relief lands disposed on the outer surface of the cylindrical member to allow each spine to be fitted into a relief land and retained therein, the retention hub further includes at least one electrode disposed at a distal portion of the retention hub.

Clause 7: The medical probe according to Clause 6, wherein the electrode lumen is disposed offset with respect to a longitudinal axis of the electrode.

Clause 8: The medical probe according to any one of Clauses 1-7, wherein the expandable basket assembly comprises at least one discrete cutout located proximate the central spine intersection of at least one tripodic structure.

Clause 9: The medical probe according to any one of Clauses 1-7, wherein the expandable basket assembly comprises at least one discrete cutout located proximate the central spine intersection of each tripodic structure.

Clause 10: The medical probe according to Clause 8 or 9, wherein the one or more cutouts comprise a centrosymmetric pattern.

Clause 11: The medical probe according to Clause 8 or 9, wherein the one or more cutouts comprise an equiangular pattern.

Clause 12: The medical probe according to any one of Clauses 8-11, wherein the one or more cutouts extend along at least a portion of each spine.

Clause 13: The medical probe according to any one of Clauses 1-12, wherein each electrode comprises a wire relief adjacent the lumen to allow for one or more wires to extend adjacent to the lumen.

Clause 14: The medical probe according to Clause 13, wherein the electrode lumen is disposed symmetrically about a longitudinal axis of the electrode.

Clause 15: The medical probe according to any one of Clauses 1-14, wherein the one or more electrodes are configured to deliver electrical pulses for irreversible electroporation, the pulses including a peak voltage of at least 900 volts (V).

Clause 16: The medical probe according to any one of Clauses 13-15, further comprising irrigation openings disposed proximate the distal end of the tubular shaft, the irrigation openings configured to deliver an irrigation fluid to the one or more electrodes.

Clause 17: The medical probe according to any one of Clauses 1-16, further comprising a plurality of insulative sleeves each disposed over the respective given spine and within the lumen of the respective electrode.

Clause 18: The medical probe according to any one of Clauses 1-16 further comprising a plurality of insulative sleeves, each insulative sleeve comprising a first lumen through which the respective given spine extends and a second lumen through which an electrical wire extends, that the first and second lumens being distinct from each other, and each insulative sleeve extends within the lumen of the respective electrode.

Clause 19: The medical probe according to any one of Clauses 13-18, further comprising: a plurality of wires each electrically joined to a respective electrode of the one or more electrodes, wherein at least a portion of the wires of the plurality of the wires respectively comprises an electrically conductive core material comprising a first electrical conductivity, an electrically conductive cover material comprising a second electrical conductivity less than the first electrical conductivity, the electrically conductive cover material circumscribing the electrically conductive core material, and an insulative jacket circumscribing the electrically conductive cover material.

Clause 20: The medical probe according to any one of Clauses 13-19, further comprising: a plurality of wires each electrically joined to a respective electrode of the one or more electrodes, wherein at least a portion of the wires of the plurality of the wires respectively comprises a plurality of strands and an insulative jacket circumscribing the plurality of the strands, and wherein each strand of the plurality of strands respectively comprises an electrically conductive core material comprising a first electrical conductivity and an electrically conductive cover material comprising a second electrical conductivity less than the first electrical conductivity, the electrically conductive cover material circumscribing the electrically conductive core material.

Clause 21: The medical probe according to any one of Clauses 1-20, wherein the planar sheet of material comprises nitinol.

Clause 22: The medical probe according to any one of Clauses 1-20, wherein the planar sheet of material comprises cobalt chromium.

Clause 23: A method of constructing a medical probe, the method comprising: cutting a first sheet of planar material to form a first structure comprising three spines including a first central spine intersection; cutting a second sheet of planar material to form a second structure comprising three spines including a second central spine intersection; overlapping the central spine intersections of the first and second structures; inserting each spine of the respective structure into a lumen of at least electrode; and fitting ends of the spines of the respective structure to a tubular shaft sized to traverse vasculature such that the central spine intersections are positioned at a distal end of the medical probe and respective spines are movable from a tubular configuration to a bowed configuration.

Clause 24: The method according to Clause 23, further comprising cutting spines of each structure from a pattern comprising longitudinal and transverse scores.

Clause 25: The method according to Clause 23 or 24, further comprising cutting a discrete cutout at the central spine intersection of at least one structure.

Clause 26: The method according to Clause 23 or 24, further comprising cutting a discrete cutout at the central spine intersection of each structure.

Clause 27: The method according to any one of Clauses 24-26, further comprising cutting each discrete cutout along at least a portion of each spine of the respective structure.

Clause 28: The method according to any one of Clauses 23-27, further comprising offsetting the electrodes between adjacent spines.

Clause 29: The method according to any one of Clauses 23-28, wherein overlapping the central spine intersection of the first and second structures further comprises rotating at least one structure along a longitudinal axis such that the spines of the respective structures are non-overlapping.

The embodiments described above are cited by way of example, and the present invention is not limited by what has been particularly shown and described hereinabove. Rather, the scope of the invention includes both combinations and sub combinations of the various features described and illustrated hereinabove, as well as variations and modifications thereof which would occur to persons skilled in the art upon reading the foregoing description and which are not disclosed in the prior art.

What is claimed is:

1. A medical probe, comprising:
   a tubular shaft including a proximal end and a distal end, the tubular shaft extending along a longitudinal axis;
   an expandable basket assembly proximate the distal end of the tubular shaft, the basket assembly comprising a first unitary tripodic structure and a second unitary tripodic structure, each tripodic structure formed from a respective planar sheet of material that includes three linear spines converging at a respective central spine intersection, each spine of each tripodic structure including a respective end connected to the distal end of the tubular shaft, the central spine intersection of each tripodic structure being positioned on the longitudinal axis at a distal end of the basket assembly; and
   one or more electrodes coupled to each of the spines, each electrode defining a lumen through the electrode so that the spine extends through the lumen of each of the one or more electrodes.

2. The medical probe according to claim 1, wherein the three linear spines extend from the central spine intersection in an equiangular pattern such that respective angles between respectively adjacent spines are approximately equal.

3. The medical probe according to claim 2, wherein the first and second unitary tripodic structures are rotated along the longitudinal axis such that the spines of the respective tripodic structure are non-overlapping.

4. The medical probe according to claim 1, wherein the expandable basket assembly is approximately oblate-spheroid.

5. The medical probe according to claim 1, wherein the expandable basket assembly comprises at least one discrete cutout located proximate the central spine intersection of at least one tripodic structure.

6. The medical probe according to claim 1, wherein the expandable basket assembly comprises at least one discrete cutout located proximate the central spine intersection of each tripodic structure.

7. The medical probe according to claim 1, wherein the planar sheet of material comprises nitinol.

8. The medical probe according to claim 1, further comprising a spine retention hub disposed proximate the distal end of the tubular shaft, the spine retention hub comprising a cylindrical member including a plurality of relief lands disposed on the outer surface of the cylindrical member to allow each spine to be fitted into a relief land and retained therein, the retention hub further includes at least one electrode disposed at a distal portion of the retention hub.

9. The medical probe according to claim 1, wherein the electrode lumen is disposed offset with respect to a longitudinal axis of the electrode.

10. The medical probe according to claim 9, wherein each electrode comprises a wire relief adjacent the lumen to allow for one or more wires to extend adjacent to the lumen.

11. The medical probe according to claim 1, wherein the one or more electrodes are configured to deliver electrical pulses for irreversible electroporation, the pulses including a peak voltage of at least 900 volts (V).

12. The medical probe according to claim 1, further comprising irrigation openings disposed proximate the distal end of the tubular shaft, the irrigation openings configured to deliver an irrigation fluid to the one or more electrodes.

13. The medical probe according to claim 1, further comprising a plurality of insulative sleeves each disposed over the respective given spine and within the lumen of the respective electrode.

14. The medical probe according to claim 1 further comprising a plurality of insulative sleeves, each insulative sleeve comprising a first lumen through which the respective given spine extends and a second lumen through which an electrical wire extends, that the first and second lumens being distinct from each other, and each insulative sleeve extends within the lumen of the respective electrode.

15. The medical probe according to claim 1, further comprising:
a plurality of wires each electrically joined to a respective electrode of the one or more electrodes,
wherein at least a portion of the wires of the plurality of the wires respectively comprises an electrically conductive core material comprising a first electrical conductivity, an electrically conductive cover material comprising a second electrical conductivity less than the first electrical conductivity, the electrically conductive cover material circumscribing the electrically conductive core material, and an insulative jacket circumscribing the electrically conductive cover material.

16. The medical probe according to claim 1, further comprising:
a plurality of wires each electrically joined to a respective electrode of the one or more electrodes,
wherein at least a portion of the wires of the plurality of the wires respectively comprises a plurality of strands and an insulative jacket circumscribing the plurality of the strands, and
wherein each strand of the plurality of strands respectively comprises an electrically conductive core material comprising a first electrical conductivity and an electrically conductive cover material comprising a second electrical conductivity less than the first electrical conductivity, the electrically conductive cover material circumscribing the electrically conductive core material.

17. A method of constructing a medical probe, the method comprising:
cutting a first sheet of planar material to form a first structure comprising three spines including a first central spine intersection;
cutting a second sheet of planar material to form a second structure comprising three spines including a second central spine intersection;
overlapping the central spine intersections of the first and second structures;
inserting each spine of the respective structure into a lumen of at least electrode; and
fitting ends of the spines of the respective structure to a tubular shaft sized to traverse vasculature such that the central spine intersections are positioned at a distal end of the medical probe and respective spines are movable from a tubular configuration to a bowed configuration.

18. The method according to claim 17, further comprising cutting spines of each structure from a pattern comprising longitudinal and transverse scores.

19. The method according to claim 17, further comprising cutting a discrete cutout at the central spine intersection of at least one structure.

20. The method according to claim 17, rotating at least one structure along a longitudinal axis such that the spines of the respective structures are non-overlapping.

* * * * *